US012629921B2

(12) United States Patent
Suzuki et al.

(10) Patent No.: US 12,629,921 B2
(45) Date of Patent: May 19, 2026

(54) METALLIZED POLYPROPYLENE FILM

(71) Applicant: Oji Holdings Corporation, Tokyo (JP)

(72) Inventors: Shigeru Suzuki, Tokyo (JP); Yoshikazu Fujishiro, Tokyo (JP); Kazuyuki Hiate, Tokyo (JP); Yoshimune Okuyama, Tokyo (JP); Masahiro Nakata, Tokyo (JP); Tadakazu Ishiwata, Tokyo (JP); Toshitsugu Takagaki, Tokyo (JP)

(73) Assignee: OJI HOLDINGS CORPORATION, Tokyo (JP)

( * ) Notice: Subject to any disclaimer, the term of this patent is extended or adjusted under 35 U.S.C. 154(b) by 183 days.

(21) Appl. No.: 18/286,400

(22) PCT Filed: Apr. 12, 2022

(86) PCT No.: PCT/JP2022/017622
§ 371 (c)(1),
(2) Date: Oct. 11, 2023

(87) PCT Pub. No.: WO2022/220248
PCT Pub. Date: Oct. 20, 2022

(65) Prior Publication Data
US 2024/0181749 A1     Jun. 6, 2024

(30) Foreign Application Priority Data

Apr. 12, 2021     (JP) ................................. 2021-067335
Apr. 30, 2021     (JP) ................................. 2021-077901

(51) Int. Cl.
*B32B 15/085*     (2006.01)
*B32B 27/32*     (2006.01)
*H01G 4/32*     (2006.01)

(52) U.S. Cl.
CPC ............ *B32B 15/085* (2013.01); *B32B 27/32* (2013.01); *H01G 4/32* (2013.01); *B32B 2255/10* (2013.01);
(Continued)

(58) Field of Classification Search
None
See application file for complete search history.

(56) References Cited

U.S. PATENT DOCUMENTS 10,093,792 B2     10/2018     Ishida et al.
11,661,507 B2     5/2023     Ishida et al.
(Continued)

FOREIGN PATENT DOCUMENTS

CN     112638645 A     4/2021
EP     3 431 530 A1     1/2019
(Continued)

OTHER PUBLICATIONS

International Search Report for PCT/JP2022/017622 dated Jul. 12, 2022.
(Continued)

*Primary Examiner* — Samir Shah
(74) *Attorney, Agent, or Firm* — Sughrue Mion, PLLC

(57)     ABSTRACT

Provided is a metallized polypropylene film having excellent insulation breakdown resistance properties. The metallized polypropylene film of the present invention has a thickness of 0.5 to 4.0 μm and has a feature such that the number of insulation breakdown points multiplied by thickness, as determined under predetermined measurement conditions for measuring the number of insulation breakdown points, is 1.90 (points/cm$^2$)·μm or less.

7 Claims, 4 Drawing Sheets

(52) U.S. Cl.
CPC ... *B32B 2255/205* (2013.01); *B32B 2307/308* (2013.01); *B32B 2307/518* (2013.01); *B32B 2307/54* (2013.01); *B32B 2307/7376* (2023.05); *B32B 2457/16* (2013.01)

(56)                References Cited

U.S. PATENT DOCUMENTS

| | | | |
|---|---|---|---|
| 2002/0172815 A1* | 11/2002 | Chang | B32B 37/153 |
| | | | 428/220 |
| 2017/0229243 A1 | 8/2017 | Nakata et al. | |
| 2018/0118904 A1 | 5/2018 | Yoda et al. | |
| 2020/0377706 A1 | 12/2020 | Ishida et al. | |
| 2021/0291427 A1* | 9/2021 | Okuyama | B29C 55/12 |
| 2023/0044276 A1 | 2/2023 | Ishida et al. | |

FOREIGN PATENT DOCUMENTS

| | | | |
|---|---|---|---|
| EP | 3 608 353 A1 | 2/2020 | |
| EP | 4 105 281 A1 | 12/2022 | |
| JP | 2014-231584 A | 12/2014 | |
| JP | 2022-088132 A | 6/2022 | |
| WO | 2009/060944 A1 | 5/2009 | |
| WO | 2016/051496 A1 | 4/2016 | |
| WO | 2016/167328 A1 | 10/2016 | |
| WO | 2018/181938 A1 | 10/2018 | |
| WO | 2018/186424 A1 | 10/2018 | |
| WO | 2019/131815 A1 | 7/2019 | |
| WO | 2019/172390 A1 | 9/2019 | |
| WO | WO-2020045523 A1 * | 3/2020 | ......... B29C 48/0018 |
| WO | 2020/246322 A1 | 12/2020 | |
| WO | 2021/162021 A1 | 8/2021 | |

OTHER PUBLICATIONS

Extended European Search Report dated Jul. 15, 2025 from the European Patent Office in Application No. 22788171.1.

\* cited by examiner

METALLIZED POLYPROPYLENE FILM

CROSS REFERENCE TO RELATED APPLICATIONS

This application is a National Stage of International Application No. PCT/JP2022/017622 filed Apr. 12, 2022, claiming priority based on Japanese Patent Application No. 2021-067335 filed Apr. 12, 2021 and Japanese Patent Application No. 2021-077901 filed Apr. 30, 2021.

TECHNICAL FIELD

The present invention relates to a metallized polypropylene film (also referred to as a metal layer-integrated polypropylene film).

BACKGROUND ART

Polypropylene films have excellent electrical properties, such as voltage resistance and low dielectric loss properties, and high moisture resistance. Making use of these advantageous properties, polypropylene films have been preferably used in electric and electronic devices, for example, as dielectric films for capacitors, such as high-voltage capacitors, filter capacitors for various switching power supplies, converters, and inverters, and smoothing capacitors. Further, polypropylene films have also started to be used as capacitors for inverter power supplies that control the drive motors of electric cars, hybrid cars, etc., for which there has been a growing demand in recent years.

The improvement of insulation breakdown resistance properties of polypropylene films is known as one of the key issues for the application of polypropylene films to various capacitors such as those described above. To achieve this purpose, research has been widely conducted (see, for example, Patent Literature (PTL) 1).

CITATION LIST

Patent Literature

PTL 1: WO2009/060944

SUMMARY OF INVENTION

Technical Problem

However, there is also an increasing demand for properties of polypropylene films themselves in order to be applicable to various high-performance capacitors developed in recent years. In particular, there has been a demand for the development of a metallized polypropylene film that has more improved insulation breakdown resistance properties than before.

The present invention was made in view of the above. An object of the present invention is to provide a metallized polypropylene film that has excellent insulation breakdown resistance properties.

Solution to Problem

The present inventors conducted extensive research to achieve the above object. As a result, the inventors found that the above object can be achieved by reducing the number of insulation breakdown points as determined by a specific measuring method to a certain number or less, and have accomplished the present invention.

Specifically, the present invention includes, for example, the subjects itemized below.

Item 1

A metallized polypropylene film comprising a biaxially stretched polypropylene film and a first metal film formed on at least one surface of the biaxially stretched polypropylene film, the metallized polypropylene film having a thickness of 0.5 to 4.0 μm, and the number of insulation breakdown points multiplied by thickness, as determined under the following conditions for measuring the number of insulation breakdown points, is 1.90 (points/cm²)·μm or less.

Conditions for Measuring the Number of Insulation Breakdown Points

A conductive substrate comprising a brass plate, a conductive rubber, and an aluminum foil stacked in this order is prepared, and a 22 μm-thick polypropylene insulating film having a 10 mm×100 mm aperture is placed on the aluminum foil-side surface of the conductive substrate. The metallized polypropylene film is placed on the top surface of the insulating film so that the first metal film is exposed to the surface side to thereby bring the metallized polypropylene film into contact with the insulating film and also bring the metallized polypropylene film into contact with the aluminum foil through the aperture portion. Subsequently, an electrode is placed on the surface of the first metal film, and a stepwise-increased voltage is applied between the first metal film and the conductive substrate at 391 V/μm, 435 V/μm, 478 V/μm, 521 V/μm, 565 V/μm, and 609 V/μm in this order, 6 times in total, each for 1 minute. The cumulative number of insulation breakdown points up to the third voltage application is counted. This counted number is divided by the area of the aperture portion of the insulating film (1000 mm²) to take the resulting value as the number of insulation breakdown points. The number of insulation breakdown points is multiplied by the thickness of the metallized polypropylene film to take the resulting value as the number of insulation breakdown points multiplied by thickness ((points/cm²)·μm).

Item 2

The metallized polypropylene film according to Item 1, wherein when a surface profile measurement of the biaxially stretched polypropylene film is performed per visual field of 240 μm×180 μm by using a light interferometric non-contact surface profiler, the total volume of protrusions with a height of 0.02 μm or more on the surface of the biaxially stretched polypropylene film is 950 μm³ to 1300 μm³ per visual field.

Item 3

A metallized polypropylene film comprising a polypropylene film and a metal layer stacked on one or both surfaces of the polypropylene film, the metallized polypropylene film having a cumulative insulation breakdown point density of 1000 points/m² or less after a cumulative DC voltage application test is performed by applying a stepwise-increased voltage in the range of 350 to 425 V/μm at 20° C.

Item 4

The metallized polypropylene film according to Item 3, wherein the polypropylene film has a thickness of 1.0 to 3.0 μm.

Item 5

The metallized polypropylene film according to Item 3 or 4, wherein when treated at 120° C. for 15 minutes, the polypropylene film has a thermal shrinkage of 0 to 8% in a first direction and a thermal shrinkage of −2 to 2% in a second direction that is orthogonal to the first direction.

Item 6

The metallized polypropylene film according to any one of Items 3 to 5, wherein when treated at 140° ° C. for 15 minutes, the polypropylene film has a thermal shrinkage of 0 to 10% in a first direction and has a thermal shrinkage of −1 to 5% in a second direction that is orthogonal to the first direction.

Item 7

The metallized polypropylene film according to any one of Items 3 to 6, wherein the polypropylene film has a tensile modulus of elasticity of 1.5 GPa or more in a first direction and a tensile modulus of elasticity of 3 GPa or more in a second direction that is orthogonal to the first direction.

Item 8

The metallized polypropylene film according to any one of Items 3 to 7, wherein the polypropylene film is a biaxially stretched film.

Item 9

The metallized polypropylene film according to any one of Items 3 to 8, wherein the polypropylene film is a single-layer film.

Item 10

The metallized polypropylene film according to any one of Items 1 to 9, which is for use in a capacitor.

Item 11

A capacitor comprising the metallized polypropylene film of any one of Items 1 to 10.

Item 12

The capacitor according to Item 11 comprising a roll of the metallized polypropylene film of any one of Items 1 to 11.

Advantageous Effects of Invention

The metallized polypropylene film of the present invention has excellent insulation breakdown resistance properties.

BRIEF DESCRIPTION OF DRAWINGS

FIG. 1 (a) is a side view of a device used in the measurement method. FIG. 1 (b) is a plan view of the device. FIG. 1 (c) is a cross-sectional view of the device. FIG. 1 (d) is an oblique-perspective view of an insulating film incorporated into the device.

DESCRIPTION OF EMBODIMENTS

Figure 1:
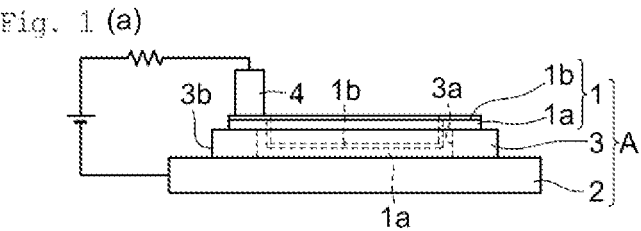
FIG. 1 is a schematic view illustrating how to measure the number of insulation breakdown points of the metallized polypropylene film of the present invention.
Figure 1:
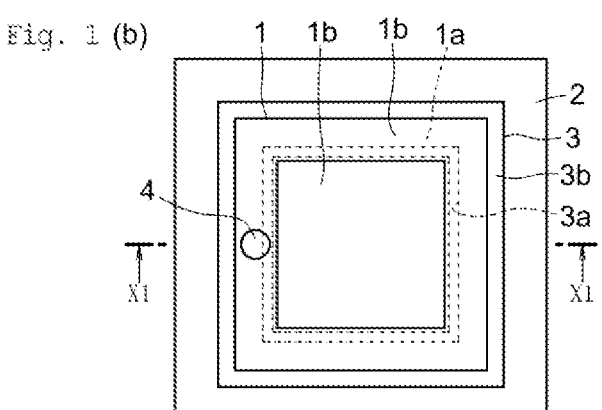
Figure 1:
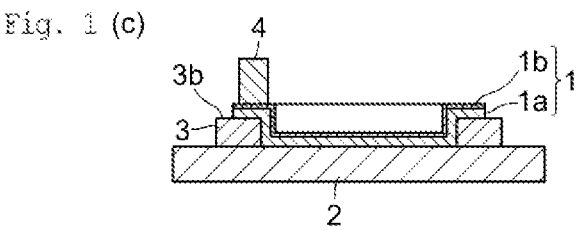
Figure 1:
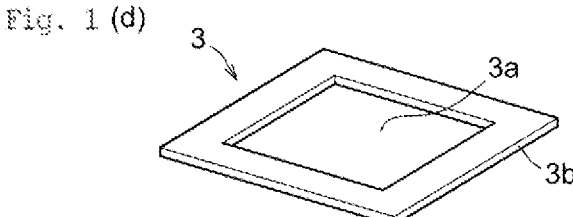

In the present specification, the terms "comprising," "containing," and "including" include the concepts of comprising, containing, consisting essentially of, and consisting of.

In the present specification, based on the range shown by describing the upper limit and/or lower limit for each parameter, ranges in which the upper limit and/or lower limit are arbitrarily exchanged between a plurality of ranges are also exemplified.

In the present specification, "X or more" (wherein X is a negative value) is the range composed of X to 0 and values greater than 0. "X or less" (wherein X is a negative value) is the range composed of X and negative values having absolute values greater than X.

The metallized polypropylene film of the present invention includes metallized polypropylene film X and metallized polypropylene film Y described below.

Metallized polypropylene film X comprises a biaxially stretched polypropylene film and a first metal film formed on at least one surface of the biaxially stretched polypropylene film, wherein the metallized polypropylene film has a thickness of 0.5 to 4.0 μm, and the number of insulation breakdown points multiplied by thickness as determined by procedures described in the following conditions for measuring the number of insulation breakdown points is 1.90 (points/cm$^2$)·μm or less.

Conditions for Measuring the Number of Insulation Breakdown points

A conductive substrate comprising a brass plate, a conductive rubber, and an aluminum foil stacked in this order is prepared. A 22 μm-thick polypropylene insulating film having a 10 mm×100 mm aperture is placed on the aluminum foil-side surface of the conductive substrate. The metallized polypropylene film is placed on the top surface of the insulating film so that the first metal film is exposed to the surface side to thereby bring the metallized polypropylene film into contact with the insulating film and also bring the metallized polypropylene film into contact with the aluminum foil through the aperture portion. Subsequently, an electrode is placed on the surface of the first metal film. A stepwise-increased voltage is applied between the first metal film and the conductive substrate at 391 V/μm, 435 V/μm, 478 V/μm, 521 V/μm, 565 V/μm, and 609 V/μm in this order, 6 times in total, each for 1 minute. The cumulative number of insulation breakdown points up to the third voltage application is counted. This counted number is divided by the area of the aperture portion of the insulating film (1000 mm$^2$) to take the resulting value as the number of insulation breakdown points. The number of insulation breakdown points is multiplied by the thickness of the metallized polypropylene film to take the resulting value as the number of insulation breakdown points multiplied by thickness.

Metallized polypropylene film Y comprises a polypropylene film and a metal layer stacked on one or both surfaces of the polypropylene film. Metallized polypropylene film Y has a cumulative insulation breakdown point density of 1000 points/m$^2$ or less after a cumulative DC voltage application test is performed by applying a stepwise-increased voltage in the range of 350 to 425 V/μm at 20° C.

Metallized polypropylene film X and metallized polypropylene film Y are described below in this order in detail.

1. Metallized Polypropylene Film X

Metallized polypropylene film X is produced by forming a metal film on one surface of a biaxially stretched polypropylene film. In the present specification, a metal film formed on one surface of the biaxially stretched polypropylene film is indicated as "first metal film." The biaxially stretched polypropylene film as referred to herein means a film formed by biaxially stretching a polypropylene resin.

Biaxially Stretched Polypropylene Film

The biaxially stretched polypropylene film comprises a polypropylene resin as a main component. The "main component" as referred to herein means that the biaxially stretched polypropylene film contains the component in an amount of 50 mass % or more, preferably 70 mass % or more, more preferably 90 mass % or more, even more preferably 95 mass % or more, and still even more preferably 99 mass % or more, on a solids basis.

The polypropylene resin is not limited in kind. For example, polypropylene resins used to form biaxially stretched polypropylene films for capacitors can be widely used.

Specific examples of polypropylene resins include propylene homopolymers such as isotactic polypropylene and syndiotactic polypropylene; copolymers of propylene and ethylene; long-chain branched polypropylenes; and ultra-high-molecular-weight polypropylenes. The polypropylene resin is preferably a propylene homopolymer. From the viewpoint of easily improving heat resistance, the polypropylene resin is more preferably isotactic polypropylene, and even more preferably isotactic polypropylene obtained by homopolymerizing polypropylene in the presence of a catalyst for olefin polymerization. In particular, since metallized polypropylene film X comprises a polypropylene resin with high stereoregularity, the free volume and relative free volume of metallized polypropylene film X can be easily adjusted to the desired values described above. The biaxially stretched polypropylene film may contain only one polypropylene resin or two or more polypropylene resins.

The biaxially stretched polypropylene film preferably contains two or more different polypropylene resins. In this case, the metallized polypropylene film is more likely to have improved insulation breakdown resistance properties. For example, the polypropylene resin contained in the biaxially stretched polypropylene film preferably comprises polypropylene resin A, which has an Mw/Mn of 8 or more (preferably 8.5 or more, and more preferably 9 or more) and polypropylene resin B, which has an Mw/Mn of less than 8 (preferably less than 7.9, and more preferably less than 7.8). The polypropylene resin in the biaxially stretched polypropylene film may consist only of polypropylene resin A and polypropylene resin B.

Polypropylene resin A has an Mw/Mn of, for example, 15 or less, preferably 13 or less, and more preferably 12 or less. Polypropylene resin B has an Mw/Mn of, for example, 5 or more, and preferably 6 or more. The content ratio of polypropylene resin A to polypropylene resin B is not particularly limited. For example, the mass ratio of polypropylene resin A:polypropylene resin B can be in the range of 1:99 to 99:1, preferably in the range of 10:90 to 90:10, more preferably in the range of 20:80 to 80:20, and particularly preferably in the range of 30:70 to 70:30.

The "polypropylene resin" referred to below without specifying whether it is a main component of metallized polypropylene film X or not means both a polypropylene resin used as the main component and a polypropylene resin used as a component other than the main component, unless otherwise specified. For example, when the specification states that "the polypropylene resin preferably has a weight average molecular weight Mw of 250000 or more and 450000 or less," it can mean both of the following: that a polypropylene resin used as the main component preferably has a weight average molecular weight Mw of 250000 or more and 450000 or less and that a polypropylene resin other than the main component preferably has a weight average molecular weight Mw of 250000 or more and 450000 or less.

In metallized polypropylene film X, the polypropylene resin preferably has a weight average molecular weight Mw of 250000 or more and 450000 or less, and more preferably 250000 or more and 400000 or less. When the polypropylene resin has a weight average molecular weight Mw of 250000 or more and 450000 or less, a moderate resin fluidity is obtained. As a result, the thickness of the cast sheet can be easily controlled and a thin stretched film with thickness uniformity can be easily produced. Further, from the viewpoint of the mechanical properties, thermo-mechanical properties, stretch moldability, etc. of the biaxially stretched polypropylene film as well, the biaxially stretched polypropylene film preferably has a weight average molecular weight Mw of 250000 or more and 450000 or less. When two or more polypropylene resins are used, a polypropylene resin with an Mw of 250000 or more and less than 330000 and a polypropylene resin with an Mw of 330000 or more and less than 450000 are preferably used in combination.

In metallized polypropylene film X, the polypropylene resin preferably has a number average molecular weight Mn of 30000 or more and 53000 or less, and more preferably 33000 or more and 52000 or less. The polypropylene resin preferably has a z-average molecular weight Mz of 500000 or more and 2100000 or less, and more preferably 700000 or more and 1700000 or less.

In metallized polypropylene film X, the molecular weight distribution [(weight average molecular weight Mw)/(number average molecular weight Mn)] of the polypropylene resin is preferably 5 or more and 12 or less, preferably 5 or more and 11 or less, and even more preferably 5 or more and 10 or less. When the polypropylene resin in metallized polypropylene film X has a molecular weight distribution [(weight average molecular weight Mw)/(number average molecular weight Mn)] of 5 or more and 12 or less, moderate resin fluidity is obtained during the biaxial stretching, which makes it easy to obtain an ultra-thin biaxially stretched polypropylene film with uniform thickness, and is thus preferable.

In the metallized polypropylene film X, the molecular weight distribution [(z-average molecular weight Mz)/(number average molecular weight Mn)] of the polypropylene resin is preferably a 10 or more and 70 or less, more preferably 15 or more and 60 or less, and even more preferably 15 or more and 50 or less.

In the present specification, the weight average molecular weight (Mw), number average molecular weight (Mn), z-average molecular weight (Mz), and molecular weight distribution (Mw/Mn and Mz/Mn) of the polypropylene resin are values measured by using a gel permeation chromatography (GPC) system. (The same applies to the values of metallized polypropylene film Y, which will be described below.) More specifically, these values are measured by using an HLC-8121GPC-HT (trade name) produced by Tosoh Corporation, which is a high-temperature GPC system with a built-in differential refractometer (RI). Three TSKgel GMHHR-H(20)HT columns produced by Tosoh Corporation are connected and used as GPC columns. The column temperature is set to 140° C., and trichlorobenzene is flown as an eluent at a flow rate of 1.0 ml/10 min to obtain measured values of Mw and Mn. A calibration curve for the molecular weight M is created by using a polystyrene standard produced by Tosoh Corporation. The measured value is converted to a polypropylene value to obtain Mw, Mn, and Mz. The base 10 logarithm of the molecular weight M of the polystyrene standard is referred to as "logarithmic molecular weight (Log (M))."

In a molecular weight differential distribution curve, the polypropylene resin in metallized polypropylene film X preferably has a difference, as obtained by subtracting the differential distribution value when Log (M)=6.0 from the differential distribution value when Log (M)=4.5, (hereinafter also referred to as "difference in differential molecular weight distribution (DM)"), of −5% or more and 14% or less, more preferably −4% or more and 12% or less, and even more preferably −4% or more and 10% or less.

Having "a difference, as obtained by subtracting the differential distribution value when Log (M)=6.0 from the differential distribution value when Log (M)=4.5" (the difference in differential molecular weight distribution (DM)), of −5% or more and 14% or less" means the following: in a comparison between a component with a logarithmic molecular weight Log (M) of 4.5, which is a representative distribution value of a component having a molecular weight of 10000 to 100000 on the lower molecular weight side (hereinafter also referred to as "a lower molecular weight component") and a component with a Log (M) of about 6.0, which is a representative distribution value of a component having a molecular weight of around 1000000 on the higher molecular weight side (hereinafter also referred to as "a higher molecular weight component") based on the Mw value of polypropylene resin, it can be understood that if the difference is positive, a larger amount of lower molecular weight component is present, whereas if the difference is negative, a larger amount of higher molecular weight component is present.

That is, for example, the molecular weight distribution Mw/Mn being 5 to 12 merely indicates the breadth of the molecular weight distribution width, and the quantitative relationship between the higher molecular weight component and the lower molecular weight component in the polypropylene resin remains unclear. From the viewpoint of resin fluidity, stretch moldability, thickness uniformity, it is preferred to use such a polypropylene resin that when a component having a molecular weight of 10000 to 100000 is compared with a component having a molecular weight of 1000000, the differential distribution value difference is −5% or more and 14% or less.

The differential distribution value is a value obtained by GPC in the following manner. A time-intensity curve (generally also referred to as "elution curve"), obtained by a differential refractometer (RI) of GPC, is used. Using a calibration curve obtained from the polystyrene standard, the time axis is converted into the logarithm molecular weight (Log (M)) to thereby convert the elution curve to a curve showing the intensity with respect to Log (M). Since the RI detection intensity is proportional to the component concentration, an integral distribution curve with respect to the logarithmic molecular weight Log (M) can be obtained when the total area of the intensity curve is defined as 100%. A differential distribution curve can be obtained by differentiating the integral distribution curve by Log (M). Accordingly, the "differential distribution" means the differential distribution of the concentration fraction with respect to the molecular weight. The differential distribution value at a specific Log (M) is read from this curve.

The polypropylene resin in metallized polypropylene film X preferably has a mesopentad fraction ([mmmm]) of less than 98.0%, more preferably 97.5% or less, even more preferably 97.4% or less, and still even more preferably 97.0% or less. Further, the mesopentad fraction is preferably 94.0% or more, more preferably 94.5% or more, and even more preferably 95.0% or more. When the mesopentad fraction is within the numerical range as described above, the crystallinity of the resin is moderately improved by the moderately high stereoregularity, and the initial voltage resistance and the long-term voltage resistance are improved. The desired stretchability can also be obtained by a moderate solidification (crystallization) speed at the time of cast sheet formation.

The mesopentad fraction [mmmm] is an index of stereoregularity that can be obtained by high-temperature nuclear magnetic resonance (NMR) spectroscopy. In the present specification, the mesopentad fraction ([mmmm]) refers to a value measured by JNM-ECP500, which is a high-temperature Fourier transform nuclear magnetic resonance system (high-temperature FT-NMR) produced by JEOL, Ltd. The observed nucleus is $^{13}C$ (125 MHZ), the measurement temperature is 135° C., and the solvent used for dissolving the polypropylene resin is o-dichlorobenzene (ODCB; a mixed solvent of ODCB and deuterated ODCB (ODCD/deuterated ODCB mixing ratio=4/1)). High-temperature NMR measurement can be performed, for example, by the method described in "Polymer Analysis Handbook, New Edition, Japan Society for Analytical Chemistry, Research Committee of Polymer Analysis, Kinokuniya Company, Ltd., 1995, p. 610." The detailed method for measuring the mesopentad fraction ([mmmm]) is as described below in the Examples.

The polypropylene resin in the metallized polypropylene film X preferably has a heptane insoluble content of 96.0% or more, and more preferably 97.0% or more. Further, the polypropylene resin preferably has a heptane insoluble (HI) content of 99.5% or less, and more preferably 99.0% or less. A higher heptane insoluble content indicates higher resin stereoregularity. When the heptane insoluble (HI) content is 96.0% or more and 99.5% or less, the resulting moderately high stereoregularity enhances the crystallinity of the resin moderately and increases voltage resistance at high temperatures. Further, the solidification (crystallization) during the cast sheet formation proceeds at a moderate rate to provide moderate stretchability. The method for measuring the heptane insoluble (HI) content is as described in the Examples.

The polypropylene resin in metallized polypropylene film X preferably has a melt flow rate (MFR) of 1.0 to 8.0 g/10 min, more preferably 1.5 to 7.0 g/10 min, and even more preferably 2.0 to 6.0 g/10 min. The method for measuring the melt flow rate of the polypropylene resin is as described in the Examples.

When the polypropylene film in metallized polypropylene film X contains two or more polypropylene resins, the polypropylene resin as the main component preferably has at least a weight average molecular weight Mw of 250000 or more and less than 345000 and an MFR of 4 to 8 g/10 min. Further, when the polypropylene film contains two or more polypropylene resins, polypropylene resins other than the main component preferably have at least a weight average molecular weight Mw of 345000 or more and 450000 or less and an MFR of 1 g/10 min or more and less than 4 g/10 min (more preferably an MFR of 1 g/10 min or more and 3.9 g/10 min or less).

In metallized polypropylene film X, the total ash content of the polypropylene resin, which is attributable to the polymerization catalyst residue and others contained in the polypropylene resin, is preferably 50 ppm or less, based on the polypropylene resin (100 parts by mass).

In order to improve electrical properties as a capacitor while inhibiting the production of polarized low-molecular-weight components, the total ash content described above (the total ash content of the polypropylene resin) is preferably 5 ppm or more and 35 ppm or less, more preferably 5 ppm or more and 30 ppm or less, and even more preferably 10 ppm or more and 25 ppm or less.

In metallized polypropylene film X, the method for producing the polypropylene resin is not particularly limited. For example, known production methods can be widely used. The polypropylene resin can be produced, for example, by using various polymerization methods, such as vapor phase polymerization, bulk polymerization, and slurry polymerization. The polypropylene resin can also be obtained, for example, from commercially available products.

In metallized polypropylene film X, the biaxially stretched polypropylene film may comprise, in addition to the polypropylene resin, other resins. The biaxially stretched polypropylene film may further comprise additives. The "additives" refer to additives generally used for polypropylene resins. The additives are not particularly limited as long as the desired polypropylene film can be obtained. Examples of additives include stabilizers such as antioxidants, chlorine absorbers, and ultraviolet absorbers, lubricants, plasticizers, flame retardants, antistatic agents, and colorants. For example, known additives that are applied to the polypropylene film for capacitors are widely applicable.

From the viewpoint of easily producing a capacitor with a high capacity, the biaxially stretched polypropylene film preferably has a thickness of, for example, 0.5 to 4.0 μm. The thickness of the biaxially stretched polypropylene film is measured using an outer micrometer (High-Accuracy Digimatic Micrometer MDH-25 MB, produced by Mitutoyo Corporation) according to Method A of JIS K 7130:1999.

The total volume of protrusions of the biaxially stretched polypropylene film is not particularly limited. When a surface profile measurement of the biaxially stretched polypropylene film is performed per visual field of 240 μm×180 μm by using a light interferometric non-contact surface profiler, the total volume of protrusions with a height of 0.02 μm or more on the surface of the biaxially stretched polypropylene film is preferably 950 μm³ or more and 1300 μm³ or less per visual field. In this case, the long-term insulation breakdown properties of the metallized polypropylene film are more likely to be improved. Furthermore, during the element winding, winding wrinkles are not formed and the film can be optimally wound. As a result, uniform contact is formed between the films, thereby improving the voltage resistance and long-term voltage resistance.

The total volume of protrusions is determined by measuring the surface profile using a light interferometric non-contact surface profiler by a three-dimensional surface roughness evaluation method. In the "three-dimensional surface roughness evaluation method," the height of the entire film surface is evaluated; therefore, the space between the films is thus evaluated three-dimensionally. Accordingly, local minute changes and variations of the surface to be measured can be grasped, and more accurate surface roughness evaluation can be made. Since the space between the films is evaluated using the total volume of three-dimensional protrusions, rather than the simple height of protrusions (two-dimensional surface roughness evaluation using general center line average roughness Ra etc.), more excellent voltage resistance and long-term voltage resistance can be obtained.

More specifically, the total volume of protrusions is measured using a VertScan 2.0 (model: R5500GML) produced by Ryoka Systems Inc. as a light interferometric non-contact surface profiler. The measurement is performed at 10 randomly selected sites on the film surface per visual field of 240 μm×180 μm in WAVE mode using a 530 white filter and an ×20 objective lens. After the obtained data are subjected to noise cancellation processing by a median filter, Gaussian filtering with a cutoff value of 30 μm is performed to remove waviness components. The roughened surface is thereby brought into a state suitable for proper measurement.

The total volume of protrusions can be determined in the following manner using the "Bearing" plug-in function of the "VS-Viewer" analysis software of "VertScan 2.0." More specifically, the value displayed as a "mountain-side volume" after the "mountain-side height threshold" is set as a predetermined height (i.e., 0.02 μm) is the total volume of protrusions per visual field. This measurement is performed at 10 sites, and the average value is determined as the total volume of protrusions per visual field.

The total volume of protrusions of the biaxially stretched polypropylene film can be adjusted by a known surface-roughening method, such as embossing or etching. In this case, it is preferable to use a surface-roughening method using β crystals, which does not require, for example, the incorporation of impurities. The proportion of β crystals formed can be controlled by changing the molecular structure or like properties of the polypropylene resin to be used. The proportion of β crystals can also be controlled by the stretching conditions, such as cast temperature and cast speed. Further, the melting ratio of crystals can be controlled by the roll temperature in the longitudinal stretching step. The surface properties can be controlled by selecting the optimal production conditions for two parameters, i.e., β-crystal formation and melting.

Method for Producing Biaxially Stretched Polypropylene Film

The method for producing a biaxially stretched polypropylene film of metallized polypropylene film X is not particularly limited. For example, known methods for producing a biaxially stretched polypropylene film can be widely used. The biaxially stretched polypropylene film is preferably produced, for example, by using an unstretched sheet. Accordingly, the method for producing the biaxially stretched polypropylene film can comprise the step of stretching an unstretched sheet.

The method for producing an unstretched sheet is not particularly limited. For example, known methods can be widely applied. For example, the unstretched sheet is obtained by supplying a starting material comprising a polypropylene resin to an extruder, heat-melting, then extruding the melt from a T-die, and cooling and solidifying the extruded melt on a metal drum.

The polypropylene resin used to obtain the unstretched sheet can be, for example, in the form of pellets. Specifically, polypropylene resin pellets, dry-mixed polypropylene resin pellets (and/or polymer powder), or mixed polypropylene resin pellets prepared by melting and kneading beforehand can be used. The starting material comprising a polypropylene resin may contain one polypropylene resin or two or more different polypropylene resins. When the starting material comprising a polypropylene resin contains two or more different polypropylene resins, the types of polypropylene resins are not particularly limited and various polypropylene resins can be used in combination.

The starting material comprising a polypropylene resin can contain additives. Examples of additives include stabilizers, such as antioxidants, chlorine absorbers, and ultraviolet absorbers, lubricants, plasticizers, flame retardants, antistatic agents, and colorants. For example, known additives used in polypropylene films for capacitors are widely applicable.

The temperature at which the starting material comprising a polypropylene resin is melted in an extruder (melting temperature) is 170° C. or more and 320° C. or less, preferably 200° C. or more and 300° ° C. or less, and more preferably 220° ° C. or more and 250° C. or less.

After the starting material comprising a polypropylene resin is heat-melted in the extruder, the resulting melt is preferably first passed through a polymer filter and then melted and extruded through a T-die. That is, when an unstretched sheet is to be produced, a polymer filter is preferably set between the extruder and the T-die. When the unstretched sheet is produced in this manner, the number of insulation breakdown points on the metallized polypropylene film of the present invention obtained as a final product tends to be lower.

The filtration accuracy of the polymer filter, i.e., the mesh size of the polymer filter, is preferably less than 20 μm (98% cut size), more preferably 15 μm or less, even more preferably 10 μm or less, and particularly preferably 5 μm or less, from the viewpoint that the number of insulation breakdown points as determined by the above measurement tends to be smaller and insulation breakdown resistance properties tend to be easily improved. However, in order to prevent deterioration of the discharge stability, the mesh size of the polymer filter should not be excessively narrow.

The filter material used for the polymer filter is not particularly limited in kind, and known filter materials can be widely used. Examples of usable materials include sintered metal nonwoven fabrics (fiber sintered materials), laminated sintered wire meshes, powder sintered materials, and the like. With respect to filter types, leaf disc filters, candle filters, and packed filters can be used without restriction. Among these, leaf disk-type filters using a sintered metal nonwoven fabric (a fiber sintered material) are preferable because such leaf disk-type filters do not increase the differential pressure (pressure loss), provides stable discharge, and has a long lifetime.

After the starting material that has been heat-melted in the extruder is passed through the polymer filter, it is melt-extruded from a T-die. The T-die temperature is not particularly limited and can be, for example, 170° C. to 320° C., and preferably from 200° ° C. to 300° C.

The heat-melted starting material is melt-extruded from a T-die and then cooled and solidified on a metal drum. An unstretched cast sheet is thereby formed. During the cooling and solidification, air can be blown over the resin by an air knife. In cooling on a metal drum, the cooling temperature (metal drum temperature) is not particularly limited. For example, an unstretched cast sheet can be formed, for example, by cooling and solidification on at least one metal drum maintained at 80 to 140° C. The metal drum temperature is preferably 90 to 120° ° C., and more preferably 90 to 105° C.

The obtained unstretched sheet preferably has a thickness of, for example, 0.05 mm or more and 2 mm or less, and more preferably 0.1 mm or more and 1 mm or less.

The biaxially stretched polypropylene film can be produced by stretching the resulting unstretched sheet. Stretching is preferably biaxial stretching that orients the film in the longitudinal and lateral axes. The stretching method is preferably a sequential biaxial stretching method. An example of the sequential biaxial stretching method is as follows. First, the unstretched sheet is maintained at a temperature of 100° C. to 160° C., and stretched 3- to 7-fold in the machine direction by passing the sheet between rolls having different speeds. The resulting sheet is immediately cooled to room temperature. Subsequently, the stretched film is guided to a tenter and stretched 3- to 11-fold in the width direction at a temperature of 160° ° C. or more. The biaxially stretched film thus obtained was relaxed and heat-fixed, and then wound. The wound biaxially stretched film can be, for example, subjected to aging treatment in an atmosphere of about 20 to 45° C. and then cut to a desired product width.

Further, if necessary, the biaxially stretched polypropylene film obtained by the above method can be treated to impart unevenness to the film surface. Various known surface-roughening methods, such as embossing and etching, can be used to impart irregularities to the film surface. Among these, a surface-roughening method using β crystals, which does not require, for example, the incorporation of impurities is preferable. The proportion of β crystals formed can be generally controlled by changing the cast temperature (the cooling temperature by the metal drum) and cast speed. Further, the melting/transformation ratio of β crystals can be controlled by the roll temperature in the longitudinal stretching step. The finely roughened surface properties can be obtained by selecting the optimum production conditions for two parameters that are β-crystal formation thereof and melting/transformation thereof.

Preferably, at least one surface of the biaxially stretched polypropylene film in metallized polypropylene film X is finely roughened to such a degree that the center line average roughness (Ra) is 0.03 μm or more and 0.08 μm or less, and that the maximum height (Rz, which is Rmax as formerly defined in JIS) is 0.3 μm or more and 0.8 μm or less. When Ra and Rz fall within the preferable range described above, the surface can be finely roughened, and winding wrinkles are less likely to be formed during the element winding in the capacitor processing, and the film can be preferably wound. Further, the films can be in uniform contact with each other, thereby improving the voltage resistance and the long-term voltage resistance as well.

The terms "Ra" and "Rz" (Rmax as formerly defined in JIS) refer to values measured by a commonly and widely used stylus-type surface roughness tester (e.g., a stylus-type surface roughness tester using a diamond stylus etc.) according to the method prescribed in, for example, JIS-B0601:

2001. More specifically, "Ra" and "Rz" (Rmax as formerly defined in JIS) can be determined, for example, by using a Surfcom 1400D-3DF-12 three-dimensional surface roughness meter (produced by Tokyo Seimitsu Co., Ltd.) according to the method prescribed in JIS-B 0601:2001.

The biaxially stretched polypropylene film obtained by the above method can be subjected to corona discharge treatment on-line or off-line. This can increase the adhesion between the polypropylene film and a metal film that will be described below. The corona discharge treatment can be performed by a known method. The corona discharge treatment may be performed in an atmosphere of, for example, air, carbon dioxide gas, nitrogen gas, or a mixed gas thereof.

Metallized Polypropylene Film X

Metallized polypropylene film X of the present invention comprises a biaxially stretched polypropylene film and a first metal film formed only on one surface of the biaxially stretched polypropylene film. The first metal film may be simply referred to as "the metal film."

The metal film in metallized polypropylene film X of the present invention functions as an electrode when the metallized polypropylene film is used as a capacitor. Examples of usable metals include single metals, such as zinc, lead, silver, chromium, aluminum, copper, and nickel; mixtures of several kinds of these metals; and alloys thereof. In consideration of, for example, the environment, economical efficiency, and capacitor performance, zinc and aluminum are preferable.

The thickness of the metal film is not particularly limited and can be the same as that of a known metallized polypropylene film used as a capacitor.

Examples of the method for stacking a metal film on one surface of the biaxially stretched polypropylene film of metallized polypropylene film X include vacuum deposition methods and sputtering methods. Vacuum deposition methods are preferable in terms of, for example, productivity and economical efficiency. Examples of vacuum deposition methods generally include a crucible method and a wire method. The method is not particularly limited and an optimal method can be appropriately selected.

From the viewpoint of preventing heat defeat of the polypropylene film, the cooling roll temperature as vapor deposition conditions in the vacuum deposition method is preferably −20° C. or less, and more preferably −23° C. or less.

In the vacuum deposition method, the thickness of the metal layer is controlled by film resistance. From the viewpoint of suppressing loss of capacitor elements, as one of the deposition conditions in the vacuum deposition method, the film resistance is preferably 25 Ω/sq or less, and more preferably 20 Ω/sq or less when an aluminum film is used; and the film resistance is preferably 5 Ω/sq or less, and more preferably 4 Ω/sq or less when a zinc film is used. From the viewpoint of self-restorability (self-healing properties), the film resistance is preferably 1 Ω/sq or more, and more preferably 5 Ω/sq or more when an aluminum film is used; and the film resistance is preferably 1 Ω/sq or more, and more preferably 2 Ω/sq or more when a zinc film is used. The thickness (the membrane resistance) of the metal film can be adjusted by the evaporation line speed and the evaporation source temperature.

When a metal film is formed by vapor deposition, the margin pattern is not particularly limited. From the viewpoint of improving properties such as fail-safe ability of the capacitor, the metal film divided by a margin (split electrode) preferably has a structure connected by a narrow metal film (a so-called fuse) (a special margin pattern). This structure enhances the fail-safe ability of the capacitor and is effective in terms of, for example, preventing the breakage and short-circuit of the capacitor. The method for forming a margin can be a commonly known method, such as a tape method or an oil method, which can be used with no restrictions.

Metallized polypropylene film X of the present invention has a thickness of 0.5 to 4.0 μm. The thickness of the metallized polypropylene film of the present invention is a value measured using an outer micrometer (High-Accuracy Digimatic Micrometer MDH-25 MB, produced by Mitutoyo Corporation) according to Method A of JIS K 7130:1999.

Metallized polypropylene film X of the present invention has an excellent voltage resistance, based on the feature that the number of insulation breakdown points multiplied by thickness, as counted under the measurement conditions described above, is 1.90 (points/cm$^2$)·μm or less; therefore, metallized polypropylene film X of the present invention can be suitably used for various capacitor element applications. The number of insulation breakdown points multiplied by the thickness of the metallized polypropylene film of the present invention is preferably 1.8 (points/cm$^2$)·μm or less, more preferably 1.7 (points/cm$^2$)·μm or less, even more preferably 1.6 (points/cm$^2$)·μm or less, and particularly preferably 1.5 (points/cm$^2$)·μm or less.

2. Measurement Conditions for Measuring the Number of Insulation Breakdown Points of Metallized Polypropylene Film X The conditions for measuring the number of insulation breakdown points of metallized polypropylene film X are described in detail here.

FIG. 1 is a schematic diagram illustrating how to measure the number of insulation breakdown points of the metallized polypropylene film of the present invention. FIG. 1 (a) is a side view of the device used in the measurement method. FIG. 1 (b) is a plan view of the device. FIG. 1 (c) is a cross-sectional view of the device. Specifically, FIG. 1 (c) is a cross-sectional view taken along line a-a of FIG. 1 (b). FIG. 1 (a) shows a circuit provided to apply voltage in step 1, whereas the circuit is not shown in FIG. 1 (b) and FIG. 1 (c).

As shown in FIG. 1, according to the above measurement method, the measurement is performed using stack A, which comprises a conductive substrate 2, an insulating film 3 made of a polypropylene film and having an aperture portion formed in the film, and metallized polypropylene film X (the metallized polypropylene film of the present invention). As shown in FIGS. 1 (a), 1 (b), and 1 (c), the insulating film 3 is disposed between the conductive substrate 2 and the metallized polypropylene film 1 of stack A. In stack A, the first metal film 1b, which is formed on one surface of the metallized polypropylene film 1, is disposed in such a manner that the first metal film 1b is exposed to the surface side of stack A. The conductive substrate 2 and the insulating film 3 that constitute stack A are explained below.

Conductive Substrate

The conductive substrate 2 is a substrate that functions as a conductor in stack A, and is a material that functions as a so-called lower conductor. The conductive substrate 2 is a three-layer stack consisting of a brass plate, a conductive rubber, and an aluminum foil stacked in this order. In stack A, the aluminum foil is disposed on the insulating film 3 side.

The type of the conductive rubber is not particularly limited. For example, known conductive rubbers can be widely used. The material of the conductive rubber is also not particularly limited, as long as the material has, for example, adequate softness and sufficient conductivity. In the measurement method, a resistor may be connected to stack A; therefore, a conductive rubber having a resistance value lower than that of the resistor is suitably used.

Insulating Film

The insulating film 3 is a layer that is disposed between the conductive substrate 2 and the metallized polypropylene film 1 in stack A, as described above, and is a layer to provide insulation between conductors (i.e., between the lower conductor described above and the upper conductor that will be described below). Accordingly, it is preferable that neither side of the insulating film 3 has a conductive material, such as a metal film of the metallized resin film 1, formed thereon.

The insulating film 3 is a polypropylene film having an aperture portion formed therein. Since it is preferable that the thickness of the insulating film 3 is sufficiently larger than the thickness of the metallized polypropylene film to be measured, the thickness of the insulating film 3 is set to 22 μm.

As shown in FIG. 1 (d), the insulating film 3 has a portion cut out to form an aperture portion 3a. The aperture portion 3a has a rectangular shape (10 mm×100 mm) in a plan view of the insulating film 3. The aperture 3a is formed in such a manner that the aperture portion 3a penetrates the insulating film 3 in the thickness direction of the film. As shown in FIG. 1 (d), the film portion outside of the aperture portion 3a in the insulating film 3 is indicated as "frame portion 3b."

As long as the aperture portion 3a is formed inside the insulating film 3, the location of the aperture portion 3a formed is not particularly limited. From the viewpoint of more effectively inhibiting the occurrence of the creeping discharge, the aperture portion 3a is preferably formed in such a manner that the aperture portion 3a is disposed inside the insulating film 3 and includes the center portion, as shown in FIG. 1 (d).

The insulating film 3 is placed on the conductive substrate 2, which is the lower conductor in stack A. Specifically, the insulating film 3 is placed on the aluminum foil in the conductive substrate 2.

Metallized Polypropylene Film 1

The metallized polypropylene film 1 is a film to be measured, and is "metallized polypropylene film X" described above. Accordingly, the metallized polypropylene film 1 is composed of a biaxially stretched polypropylene film 1a and a first metal film 1b formed on one surface of the biaxially stretched polypropylene film 1a.

The first metal film 1b is disposed in such a manner that the first metal film 1b is exposed to the surface side of stack A. That is, the metallized polypropylene film 1 is placed on the insulating film 3 in such a manner that the surface of the metallized polypropylene film 1 on the side of the first metal film 1b is on the side opposite to the side of the insulating film 3. By positioning the first metal film 1b in such a manner that the first metal film 1b is exposed to the surface side of stack A, the first metal film 1b functions as a conductor in stack A and thus functions as a so-called upper conductor. Thus, stack A comprises an upper conductor formed of the first metal film 1b and a lower conductor formed of the conductive substrate 2. The descriptions of the upper conductor and the lower conductor merely express the vertical direction when the conductive substrate 2 is placed on a test stand or the like as shown in FIG. 1 (a), and do not necessarily mean that the first metal film 1b is disposed on the upper side and the conductive substrate 2 on the lower side.

In stack A, the metallized polypropylene film 1 is disposed so as to be in contact with the insulating film 3 and also in contact with the conductive substrate 2 through an aperture portion formed in the insulating film 3. More specifically, the metallized polypropylene film 1 is disposed so as to be in contact with a portion of the insulating film 3 other than the aperture portion 3a, i.e., the surface of the frame portion 3b described above (see FIG. 1 (d)), and also in contact with the surface of the conductive substrate 2, which is exposed through the aperture portion 3a. Thus, as shown in FIG. 1 (b), stack A has a region where a part of the metallized resin film 1 is fitted into the aperture portion 3a. This region is hereafter referred to as "region R."

The metallized polypropylene film 1 is disposed in such a manner that the first metal film 1b is disposed in the entire range of region R. Even if the metallized polypropylene film 1 has a site where the metal film is not formed (a so-called margin), the margin and the region R should not overlap. This enables highly accurate measurement of the number of insulation breakdown points of the metallized polypropylene film 1.

When the metal film of the metallized polypropylene film 1 to be measured has a so-called heavy edge, i.e., an edge formed thicker than the other portions, the heavy edge should not overlap with the region R. This also enables high accuracy measurement of the number of insulation breakdown points of the metallized polypropylene film 1.

Voltage Application and Counting of the Number of Insulation Breakdown Points

The number of electric breakdown points is determined by applying voltage to stack A. In this case, an electrical connection is made to apply voltage between the conductive substrate 2 (the lower conductor) and the first metal film 1b (the upper conductor). For the lower conductor, an electrical connection can be easily made by connecting a wire to the conductive substrate 2. On the other hand, since the upper conductor is a metal film 1b, an electrode 4 is used to facilitate making an electrical connection.

Specifically, as shown in FIG. 1 (a), an electrical connection can be made by placing the electrode 4 on the metal film 1b. When the electrode 4 is disposed on the surface of the first metal film 1b, an electrical connection is made between the first metal film 1b (the upper conductor) and the electrode 4 by the weight of the electrode 4. The electrode 4 can be placed anywhere on the surface of the first metal film 1b as long as it is a portion other than the region R. The electrode 4 to be used is a cylindrical brass electrode.

For voltage application, in addition to stack A and the electrode 4, for example, a commercially available high-voltage power supply and a resistor are used. As shown in FIG. 1 (a), these are connected in series and wired to the conductive substrate 2 (the lower conductor) and the first metal film 1b (the upper conductor). Connecting the resistor facilitates the prevention of overvoltage (overshooting) during the voltage application and also facilitates the suppression of excessive short-circuit current flow during insulation breakdown. The resistance value of the resistor can be appropriately set according to the object to be tested, for example, in the range of several hundred ohms to several hundred kilo-ohms.

After the electrode 4 is placed on the surface of the first metal film, a stepwise-increased voltage is applied to the metallized polypropylene film between the first metal film and the conductive substrate at 391 V/μm, 435 V/μm, 478 V/μm, 521 V/μm, 565 V/μm, and 609 V/μm in this order 6 times in total, each for 1 minute. The cumulative number of insulation breakdown points up to the third voltage application (478 V/μm) (i.e., the cumulative number of insulation breakdown points from the first voltage application to the third voltage application) is counted. The counted number is divided by the area of the aperture portion of the insulating film (i.e., 10 mm×100 mm=1000 mm$^2$) to take the resulting value as the number of insulation breakdown points. The number of insulation breakdown points is multiplied by the thickness of the metallized polypropylene film to take the resulting value as the number of insulation breakdown points multiplied by thickness ((points/cm$^2$)·μm). The unit "(points/cm$^2$)·μm" can also be expressed as points/cm$^2$·μm, (points/cm$^2$)×μm, points·μm/cm$^2$, or points×μm/cm$^2$.

Before the voltage application, stack A is smoothed down with a static elimination brush in advance. This can remove any voids formed between the layers, in particular, between the polypropylene film 1 and the lower layer, if any. Even if voids remain after such a treatment with a static elimination brush, electrostatic adsorption occurs upon voltage application in step 1, which further removes voids and enables a more accurate measurement of the number of insulation breakdown points. After the voltage application is started, further treatment with the static elimination brush can be made unnecessary.

The number of insulation breakdown points is determined by performing all of the visual counting, sound counting, light counting, and instantaneous electric current threshold counting, and taking the largest counting number of all the numbers obtained by these counting means as the number of insulation breakdown points of the metallized polypropylene film.

In the visual counting of the number of insulation breakdown points, the metallized polypropylene film 1 is visually observed after voltage application, and the insulation breakdown portions that can be visually recognized are counted. When a high voltage is applied to the metallized resin film 1, a site with a low voltage resistance has insulation breakdown. When the insulation breakdown occurs, the metallized resin film 1 generates heat instantaneously, thus causing the film temperature to rise. This temperature rise causes the first metal film, which is the upper conductor, to evaporate, thereby restoring insulation, that is, a so-called self-healing phenomenon occurs. Since the metal film has evaporated, self-healing scars are visually recognized as being whiter than the surrounding area due to the light transmittance of the self-healed sites. Therefore, the number of insulation breakdown points of the metallized polypropylene film 1 can be visually counted by counting the number of the insulation breakdown sites (self-healing sites).

In counting the number of insulation breakdown points based on sound, since a characteristic sound emits at the time of insulation breakdown, the number of sounds generated during the voltage application is taken as the number of insulation breakdown points. In counting the number of insulation breakdown points based on light, since a characteristic light emits at the time of insulation breakdown, the number of lights emitted during the voltage application can be taken as the number of insulation breakdown points. Alternatively, the number of insulation breakdown points can be counted by detecting the emitted light with a light sensor or by other means.

Since the measurement according to the measurement method described above can be made at a location closer to the center of the metallized polypropylene film 1, rather than at the periphery of the metallized polypropylene film 1, creeping discharge tends to be easily inhibited. The more inside of the insulation film 3 the aperture portion 3a is disposed, the more inside of the film the actual measurement site of the metallized resin film 1 is located. Thus, in this case, unnecessary creeping discharge can be more easily inhibited and a high measurement accuracy can be achieved.

3. Metallized Polypropylene Film Y

Metallized polypropylene film Y is a metallized polypropylene film comprising a polypropylene film and a metal layer stacked on one or both surfaces of the polypropylene film, the metallized polypropylene film having a cumulative insulation breakdown point density of 1000 points/m$^2$ or less after a cumulative DC voltage application test is performed by applying a stepwise-increased voltage in the range of 350 to 425 V/μm at 20° C.

Metallized polypropylene film Y comprises a polypropylene film and a metal layer stacked on one or both surfaces of the polypropylene film. For the sake of convenience, the metallized polypropylene film is referred to as "metal layer-integrated polypropylene film." In the present specification, metallized polypropylene film Y may be referred to as "the metal layer-integrated polypropylene film of the present invention." The polypropylene film of the metal layer-integrated polypropylene film of the present invention (i.e., the polypropylene film without a metal layer stacked thereon) may be referred to as "the polypropylene film of the present invention" in the present specification. These are explained below.

Metallized polypropylene film Y has a cumulative insulation breakdown point density of 1000 points/m$^2$ or less after a cumulative DC voltage application test is performed by applying a stepwise-increased voltage in the range of 350 to 425 V/μm at 20° C. (i.e., a cumulative insulation breakdown point density at 20° C. and 425 V/μm). When the cumulative insulation breakdown point density is 1000 points/m$^2$ or less, not only a capacitor having a certain level of processing suitability and a certain level of capacitance stability, but also a capacitor having excellent insulation resistance stability under high-temperature and high-voltage conditions can be obtained. The cumulative insulation breakdown point density is preferably 900 points/m$^2$ or less, more preferably 800 points/m$^2$ or less, even more preferably 700 points/m$^2$ or less, still even more preferably 600 points/m$^2$ or less, particularly preferably 500 points/m$^2$ or less, particularly more preferably 400 points/m$^2$ or less, particularly even more preferably 300 points/m$^2$ or less, particularly still even more preferably 200 points/m$^2$ or less, and especially preferably 100 points/m$^2$ or less. Among the particularly preferred embodiments, the cumulative insulation breakdown point density is preferably 50 points/m$^2$ or less, more preferably 20 points/m$^2$ or less, even more preferably 10 points/m$^2$ or less, still even more preferably 5 points/m$^2$ or less, and particularly preferably 0 points/m$^2$.

Figure 3:
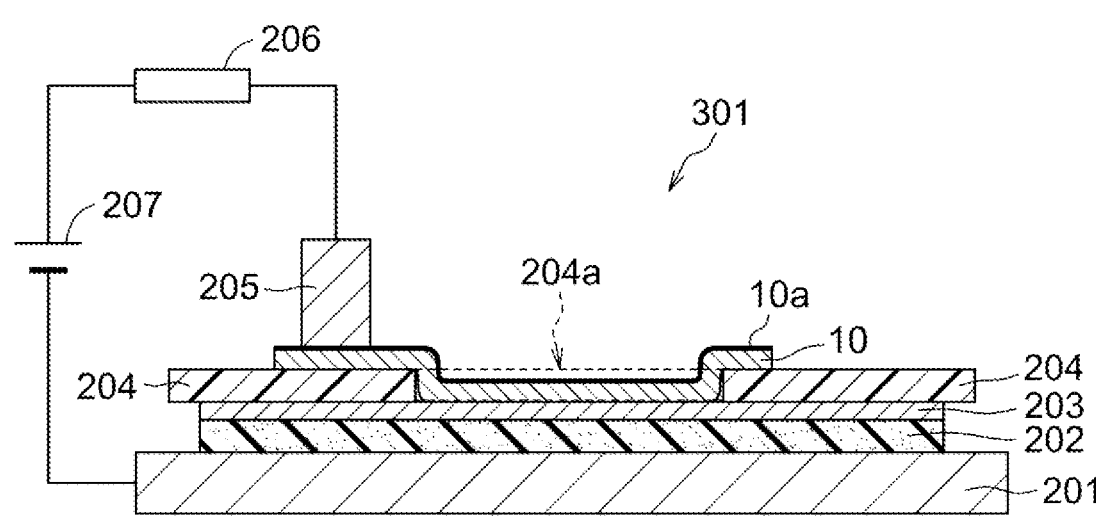
FIG. 3 is a schematic diagram of a device for measuring the cumulative insulation breakdown point density.

The cumulative insulation breakdown point density is measured by setting the metal layer-integrated polypropylene film to a measuring device so as to be configured as shown in FIG. 3. After a DC voltage of 350 V/μm is applied at 20° C. for 1 minute, the number of insulation breakdown points in the window region of the insulating polypropylene film (100 mm×10 mm) is visually counted. After counting, a DC voltage of 375 V/μm is applied and the number of cumulative insulation breakdown points in the window region of the insulating polypropylene film is visually counted. Subsequently, the DC voltage to be applied is increased by 25 V/μm. This operation is repeated to cumulatively apply DC voltage until the DC voltage has reached 425 V/μm. The test is performed by using 5 sheets of metal layer-integrated polypropylene films. The average of the cumulative insulation breakdown points at 20° C. and 425V/μm is divided by the area of the window of the insulating polypropylene film (100 mm×10 mm=1,000 mm$^2$=0.001 m$^2$) to obtain a cumulative insulation breakdown point density at 20° C. and 425 V/μm (unit: points/m$^2$).

The details of FIG. 3 and the measuring method are as follows. FIG. 3 is a schematic diagram for illustrating how to measure the cumulative insulation breakdown point density. First, a brass plate 201 (320 mm×250 mm), a conductive rubber 202 (280 mm×150 mm), and an aluminum foil 203 (280 mm×150 mm) are sequentially stacked. Further, an insulating polypropylene film 204 (300 mm×210 mm, window: 100 mm×10 mm) having a quadrangular cut-out section (100 mm×10 mm) formed in the center portion (this portion is referred to below as "window 204a") is stacked on the aluminum foil 203 in such a manner that the insulating polypropylene film 204 covers the perimeter of the aluminum foil 203.

A metal layer-integrated polypropylene film 1 (metallized polypropylene film Y) is overlaid on the insulating polypropylene film 204 stacked as described above, in such a manner that the metal layer-integrated polypropylene film 1 does not extend beyond the perimeter of the insulating polypropylene film 204. The metal layer-integrated polypropylene film 1 is overlaid with the metal deposition surface 10a of the metal layer-integrated polypropylene film 1 facing up and in such a manner that the metal deposition layer 10a covers the window 204a of the insulating polypropylene film 204. However, when a special deposition pattern margin is formed in the metal layer-integrated polypropylene film 1, the portion of the metal deposition layer 10a that overlaps the window 204a is preferably a portion of the metal deposition layer 10a without a special margin, i.e., a portion of the so-called blanket deposition of the metal deposition layer 10a. The cooling roll contact surface of the metal layer-integrated polypropylene film 1 overlaid on the insulating polypropylene film 204 as described above comes into contact with the surface of the aluminum foil 203 through the window 204a of the insulating polypropylene film 204.

Further, a cylindrical brass electrode 205 (diameter: 25 mm and height: 65 mm) is placed on the metal deposition layer 10a at a site away from the window 204a of the metal layer-integrated polypropylene film 1 overlaid on the insulating polypropylene film 204 as described above. With this displacement, the cylindrical brass electrode 205 is in contact with the metal deposition layer 3a.

The cylindrical brass electrode 205 is electrically connected to a DC power source 207 via a resistor element (10 kΩ) 206 for overcurrent prevention. Further, a brass plate 201 is directly connected electrically to the DC power source 207. A cumulative insulation breakdown point density tester 301 is configured as described above.

If the cumulative insulation breakdown point density of the metal layer-integrated polypropylene film 1 is measured with the cumulative insulation breakdown point density tester 301, the voltage resistance that will be achieved when a capacitor has been produced from the film can be predicted at the stage of the metal layer-integrated polypropylene film, even without producing the capacitor. When a high voltage is applied with a DC power source 207 in the cumulative insulation breakdown point density tester 301, insulation breakdown occurs at the sites of the metal layer-integrated polypropylene film 1 having a low voltage resistance. When insulation breakdown occurs, heat generates instantaneously. Therefore, the metal deposition layer 10a evaporates and insulation is restored (self-healed). The sites where self-healing occurs are visually recognized as cloudy because the metal deposition layer 10a has evaporated. After a predetermined voltage is applied for a certain period of time, the number of sites where self-healing occurs (referred to below as "the number of insulation breakdown points") is counted, whereby the voltage resistance of the metal layer-integrated polypropylene film can be evaluated.

The number of insulation breakdown points depends on the voltage resistance of the metal layer-integrated polypropylene film 1 and properties of the metal deposition layer 10a. That is, whether the metal deposition layer 10a easily evaporates or not also affects whether the number of insulation breakdown points is large or small. Since the cumulative insulation breakdown point density tester 301 comprises a metal deposition layer 10a as the upper conductor, it is possible to see properties similar to those of the actual capacitor formed.

The cumulative insulation breakdown point density test is performed in the following manner. While the voltage to be applied is increased in stages from a given start voltage to an end voltage at regular intervals, the voltage is applied for a certain period of time. At each voltage application, the number of insulation breakdown points of the metal layer-integrated polypropylene film 1 is cumulatively counted. This cumulative counting is repeated (the number counted cumulatively is referred to below as "the cumulative number of insulation breakdown points"). After the cumulative counting is repeated up to the end voltage, the cumulative number of insulation breakdown points of the metal layer-integrated polypropylene film 1 is divided by the area of window 204a (100 mm×10 mm=1,000 mm$^2$=0.001 m$^2$) to obtain the cumulative insulation breakdown point density (unit: points/m$^2$). According to the cumulative insulation breakdown point density measurement, the window 204a allows the voltage to be applied to a certain area and can also prevent the creeping discharge. Therefore, a more accurate measurement of the cumulative insulation breakdown point density can be made.

When treated at 120° C. for 15 minutes, metallized polypropylene film Y preferably has a thermal shrinkage of 0 to 8% (more preferably 0 to 6%, and even more preferably 0 to 4%) in a first direction and preferably has a thermal shrinkage of −2 to 2% (more preferably −1 to 1%) in a second direction, which is orthogonal to the first direction. When metallized polypropylene film Y is a biaxially stretched polypropylene film, the first direction is preferably the MD direction (machine direction) of the polypropylene film, and the second direction is preferably the TD direction (transverse direction) of the polypropylene film. When the thermal shrinkage of the metallized polypropylene film in the first direction under the treatment conditions of 120° C. for 15 minutes is 0% or more (that is, the thermal expansion is 0% or less) and the thermal shrinkage in the second direction is −2% or more (that is, the thermal expansion is −2% or less), and when the thermal shrinkage in the first direction is 8% or less (that is, the thermal shrinkage is −8% or more) and the thermal shrinkage in the second direction is 2% or less (that is, the thermal expansion is −2% or more), thermal expansion and thermal shrinkage of the film on the cooling roll during the metal deposition processing are more effectively inhibited to suppress the formation of wrinkles during conveyance, thereby enhancing the adhesion of the polypropylene film to the cooling roll, and suppressing heat damage and enhancing the voltage resistance of the metal layer-integrated polypropylene film.

The thermal shrinkage under the treatment conditions of 120° C. for 15 minutes (thermal shrinkage at 120° C.) (unit: %) is measured as follows. The sample used for measurement is cut out from the roll. When the thermal shrinkage at 120° C. in the first direction is to be measured, the sample size is 130 mm in the first direction and 20 mm in the second direction. When the thermal shrinkage at 120° C. in the second direction is to be measured, the sample size is 20 mm in the first direction and 130 mm in the second direction. Three samples for measuring the thermal shrinkage at 120° C. in the first direction and three samples for measuring the thermal shrinkage at 120° C. in the second direction are prepared. Next, for the three samples for measuring the thermal shrinkage at 120° ° C. in the first direction, a marking line is drawn at a position 15 mm away from each end of a sample having a length of 130 mm in the first direction. In this case, the distance between the marking lines is 100 mm. On the three samples for measuring the thermal shrinkage at 120° C. in the second direction, a marking line is drawn at a position 15 mm away from each end of a sample having a length of 130 mm in the second direction. In this case, the distance between the marking lines is 100 mm. Subsequently, each sample with the marking lines drawn is hung with no load in such a manner that the direction cut out to a length of 130 mm is a vertical direction in a hot air circulation constant-temperature chamber at 120° ° C., and is maintained for 15 minutes. Each sample is then cooled at room temperature (23° C.), and the distance between the marking lines is measured with a ruler. The thermal shrinkage (%) is calculated by the following formula.

Thermal shrinkage (%)=(Distance between marking lines before heating−Distance between marking lines after heating)/Distance between marking lines before heating×100

The average of the thermal shrinkage at 120° C. of the three samples in the first direction is defined as the thermal shrinkage (%) at 120° C. in the first direction. The average of the thermal shrinkage at 120° C. of the three samples in the second direction is defined as the thermal shrinkage (%) at 120° C. in the second direction. The measurement conditions other than those described herein are according to "25. Dimensional change" of JIS C 2151:2019.

When treated at 140° C. for 15 minutes, metallized polypropylene film Y preferably has a thermal shrinkage of 0 to 10% (more preferably 0 to 8%, and even more preferably 0 to 7%) in a first direction and preferably has a thermal shrinkage of −1 to 5% (more preferably 0 to 4%) in a second direction, which is orthogonal to the second direction. When the thermal shrinkage of the metallized polypropylene film in the first direction under the treatment conditions of 140° C. for 15 minutes is 0% or more (that is, the thermal expansion is 0% or less) and the thermal shrinkage in the second direction is −1% or more (that is, the thermal expansion is 1% or less), and when the thermal shrinkage of the metallized polypropylene film in the first direction is 10% or less (that is, the thermal expansion is −10% or more) and the thermal shrinkage in the second direction is 5% or less (that is, the thermal expansion is −5% or more), thermal expansion and thermal shrinkage of the film on the cooling roll during the metal deposition processing are more effectively inhibited to suppress the formation of wrinkles during conveyance, thereby enhancing the adhesion of the polypropylene film to the cooling roll, and to suppress heat damage, thereby enhancing the voltage resistance of the metal layer-integrated polypropylene film.

The thermal shrinkage under the treatment conditions of 140° C. for 15 minutes (thermal shrinkage at 140° C.) (unit: %) is measured in the same manner as the method for measuring the thermal shrinkage at 120° C. except that a hot air circulation constant-temperature chamber of 140° C. is used in place of the hot air circulation constant-temperature chamber of 120° ° C. to calculate the thermal shrinkage at 140° C. in the first direction and the thermal shrinkage at 140° C. in the second direction.

Preferably, metallized polypropylene film Y has a tensile modulus of elasticity in a first direction of 1.5 GPa or more (more preferably 2.0 GPa or more) and a tensile modulus of elasticity in a second direction, which is orthogonal to the first direction, of 3.0 GPa or more (more preferably 4.0 GPa or more). If the tensile modulus of elasticity in the first direction is 1.5 GPa or more and the tensile modulus of elasticity in the second direction is 3.0 GPa or more, the formation of wrinkles during conveyance in the metal deposition processing is more effectively suppressed to thereby achieve a higher adhesion of the polypropylene film to the cooling roll, and heat damage can be suppressed to thereby achieve a higher voltage resistance of the metal layer-integrated polypropylene film. In one embodiment of the present invention, there is no particular limitation on the upper limit of the tensile modulus of elasticity of the polypropylene film of the present invention in any direction. However, the upper limit can be substantially 6.0 GPa.

The tensile modulus of elasticity (unit: GPa) is measured in accordance with JIS K-7127 (1999). The sample used for the measurement is cut out from a roll. When the tensile modulus in the first direction is to be measured, the size of the sample is 200 mm in the first direction and 15 mm in the second direction. When the tensile modulus in the second direction is to be measured, the size of the sample is 15 mm in the first direction and 200 mm in the second direction. After each sample is cut out, a tensile test is performed by using a tensile compression tester (produced by Minebea Co., Ltd.) under the conditions of a measurement temperature of 23° C. and an inter-chuck distance of 100 mm and a tensile speed of 200 mm/min. Subsequently, the tensile modulus of elasticity (GPa) in the first direction and the tensile modulus of elasticity (GPa) in the second direction are obtained from automatic analysis by the data processing software built into the tester.

Metallized polypropylene film Y preferably has a thickness of 9.5 μm or less, more preferably 6.0 μm or less, even more preferably 3.0 μm or less, still even more preferably 2.9 μm or less, particularly preferably 2.8 μm or less, and particularly more preferably 2.5 μm or less. The polypropylene film of the present invention preferably has a thickness of 0.8 μm or more, more preferably 1.0 μm or more, even more preferably 1.4 μm or more, still even more preferably 1.5 μm or more, and particularly preferably 1.8 μm or more. In particular, a thickness within the range of, for example, 1.0 to 6.0 μm, 1.0 to 3.0 μm, or 1.0 to 2.9 μm is preferable because excellent slitting processability, blocking suppression during the vapor deposition step, and element-winding processability are provided in spite of a very low thickness of the polypropylene film. A thickness of 9.5 μm or less can increase the capacitance, and the polypropylene film of the present invention can thus be suitably used for capacitors. From the viewpoint of production, the thickness can be 0.8 μm or more.

The film thickness is measured according to JIS-C2330, except that the thickness is measured at 100±10 kPa by using an MEI-11 paper thickness measuring instrument, produced by Citizen Seimitsu Co., Ltd.

The haze value of metallized polypropylene film Y is not particularly limited. Metallized polypropylene film Y has a haze of, for example, 2.2 to 5.0%, preferably 2.3 to 4.5%, more preferably 2.5 to 4.5%, even more preferably 2.5 to 4.0%, and still even more preferably 2.5 to 3.5%. The haze value is measured as follows. Using a haze meter ("NDH-5000" produced by Nippon Denshoku Industries Co., Ltd.), the haze value is measured in accordance with JIS K 7136:2000. The size of each sample is 50 mm×100 mm.

Metallized polypropylene film Y may be a biaxially stretched film, a uniaxially stretched film, or an unstretched film. Among these, a biaxially stretched film is preferred.

In metallized polypropylene film Y, the layer structure of the polypropylene film is not particularly limited, and may be a single layer consisting of one layer, or may be multiple layers having the same or different compositions. In metallized polypropylene film Y, the polypropylene film is preferably a film composed of one or more film-forming layers, and more preferably a monolayer film (a film composed of a single film-forming layer).

In metallized polypropylene film Y, the polypropylene film contains a polypropylene resin as the main component. The "main component" is the same as the "main component" in metallized polypropylene film X.

In metallized polypropylene film Y, the polypropylene resin is not particularly limited. One polypropylene resin may be used alone, or two or more polypropylene resins may be used in combination. A polypropylene resin that forms β spherulites when formed into a cast sheet is particularly preferred. The polypropylene resin is preferably a linear polypropylene resin, and more preferably a linear homopolypropylene resin.

The total ash content of the polypropylene resin is preferably as low as possible for electrical properties. The total ash content is preferably 50 ppm or less, more preferably 40 ppm or less, and even more preferably 30 ppm or less, based on the polypropylene resin. The lower limit of the total ash content is, for example, 2 ppm or 5 ppm. A lower total ash content means a decreased content of impurities, such as polymerization catalyst residues.

In metallized polypropylene film Y, the polypropylene resin can contain, for example, a first polypropylene resin alone, or can contain a second polypropylene resin in combination in addition to a first polypropylene resin. The first polypropylene resin and the second polypropylene resin will be described below.

In metallized polypropylene film Y, the polypropylene resin can contain a first polypropylene resin. When the polypropylene resin contains a first polypropylene resin, the first polypropylene resin content is preferably 50 wt. % or more, more preferably 55 wt. % or more, and even more preferably 60 wt. % or more, based on 100 wt. % of the polypropylene resin. The upper limit of the content of the first polypropylene resin is, for example, 100 wt. % or less, 99 wt. % or less, 98 wt. % or less, or 95 wt. % or less, based on 100 wt. % of the polypropylene resin, and is preferably 90 wt. % or less, more preferably 85 wt. % or less, and even more preferably 80 wt. % or less, based on 100 wt. % of the polypropylene resin. Thus, the polypropylene film according to this embodiment may contain the first polypropylene resin as the main component. The first polypropylene resin can be, for example, isotactic polypropylene.

The first polypropylene resin preferably has a weight average molecular weight Mw of 250000 or more and less than 400000, more preferably 260000 or more and 370000 or less, and even more preferably 270000 or more and 350000 or less. When the Mw is 250000 or more and less than 400000, moderate resin fluidity is obtained, and the thickness of the cast sheet is easily controlled, and a thin stretched film with excellent thickness uniformity can be easily produced. When the Mw is 250000 or more and 350000 or less, moderate resin fluidity is obtained, the thickness of the cast sheet is more easily controlled, and a thin stretched film with excellent thickness uniformity can be more easily produced.

The first polypropylene resin preferably has a number average molecular weight Mn of 30000 or more and 52000 or less, more preferably 32000 or more and 50000 or less, and even more preferably 34000 or more and 48000 or less. The first polypropylene resin preferably has a z-average molecular weight Mz of 600000 or more and 1650000 or less, and more preferably 700000 or more and 1600000 or less.

The first polypropylene resin preferably has a molecular weight distribution (Mw/Mn) of 5.0 or more, and more preferably 5.5 or more. The first polypropylene resin preferably has an Mw/Mn of 11.0 or less, and more preferably 10.0 or less. When the Mw/Mn of the first polypropylene resin is 5.0 or more and 11.0 or less, moderate resin fluidity is obtained during the biaxial stretching and it becomes easy to obtain an ultra-thin biaxially stretched polypropylene film with no thickness unevenness. The molecular weight distribution Mw/Mn is a ratio of the weight average molecular weight Mw to the number average molecular weight Mn.

The first polypropylene resin preferably has a molecular weight distribution (Mz/Mn) of 10 or more and 60 or less, more preferably 12 or more and 50 or less, and even more preferably 15 or more and 45 or less. The molecular weight distribution Mz/Mn is a ratio of the z-average molecular weight Mz to the number average molecular weight Mn.

The weight average molecular weight (Mw), number average molecular weight (Mn), z-average molecular weight (Mz), and molecular weight distribution (Mw/Mn and Mz/Mn) of the polypropylene resin in metallized polypropylene film Y are values measured by using a gel permeation chromatography (GPC) system. More specifically, these values are measured by using an HLC-8121GPC-HT (trade name) produced by Tosoh Corporation, which is a high-temperature GPC system with a built-in differential refractometer (RI). The measured values Mw and Mn are obtained by using three connected TSKgel GMHhr-H(20)HT columns for GPC, produced by Tosoh Corporation, with the column temperature being set to 140° C. and with trichlorobenzene used as an eluent being allowed to flow at a flow rate of 1.0 mL/10 min. A calibration curve of the molecular weight M of the polystyrene standard produced by Tosoh Corporation was prepared, and the measured values were converted into polystyrene values to thereby obtain Mw, Mn, and Mz of the polypropylene resin.

The first polypropylene resin of metallized polypropylene film Y preferably has a melt flow rate (MFR) at 230° C. of 8.0 g/10 min or less, more preferably 7.0 g/10 min or less, and even more preferably 6.0 g/10 min or less. The first polypropylene resin preferably has a melt flow rate (MFR) at 230° C. of 3.5 g/10 min or more. The melt flow rate at 230° C. is measured according to JIS K 7210-1999 under a load of 2.16 kg at 230° C. The unit "g/10 min" of the melt flow rate is also referred to as "dg/min."

The first polypropylene resin of metallized polypropylene film Y preferably has a heptane insoluble content of 97.0% or more. The heptane insoluble content is preferably 98.5% or less. A higher heptane insoluble content indicates higher resin stereoregularity. A heptane insoluble (HI) content of 97.0% or more and 98.5% or less moderately enhances the crystallinity of the polypropylene resin in the polypropylene film due to the moderately high stereoregularity, and increases voltage resistance at high temperatures. Further, a moderate solidification (crystallization) rate during the cast sheet formation is achieved, resulting in moderate stretchability. The method for measuring the heptane insoluble (HI) content is as described in the Examples.

The total ash content of the first polypropylene resin is preferably as low as possible for electrical properties. The total ash content based on the first polypropylene resin is preferably 50 ppm or less, more preferably 40 ppm or less, and even more preferably 30 ppm or less. The lower limit of the total ash content is, for example, 2 ppm or 5 ppm.

The polypropylene resin in metallized polypropylene film Y may further contain a second polypropylene resin. The polypropylene film according to this embodiment preferably contains a second polypropylene resin in addition to the first polypropylene resin. More preferably, the resins that form the polypropylene film are the first polypropylene resin and the second polypropylene resin.

When the polypropylene resin contains a second polypropylene resin, the second polypropylene resin content is preferably 50 wt. % or less, more preferably 49 wt. % or less, even more preferably 45 wt. % or less, and particularly preferably 40 wt. % or less, based 100 wt. % of the polypropylene resin. Further, when the polypropylene resin contains a second polypropylene resin, the lower limit of the second polypropylene resin content is, for example, 1 wt. % or more, 2 wt. % or more, or 5 wt. % or more, based on 100 wt. % of the polypropylene resin, and is preferably 10 wt. % or more, more preferably 15 wt. % or more, and even more preferably 20 wt. % or more, based on 100 wt. % of the polypropylene resin. The second polypropylene resin can bean, for example, isotactic polypropylene.

The second polypropylene resin preferably has an Mw of 300000 or more, and more preferably 350000 or more. The second polypropylene resin preferably has an MW of 450000 or less, and more preferably 400000 or less.

The second polypropylene resin preferably has an Mn of 40000 or more and 54000 or less, more preferably 42000 or more and 50000 or less, and even more preferably 44000 or more and 48000 or less.

The second polypropylene resin preferably has an Mz of more than 1550000 and 2000000 or less, and more preferably 1580000 or more and 1700000 or less.

The ratio of Mw to Mn (Mw/Mn) in the second polypropylene resin is preferably 5.5 or more, more preferably 7.0 or more, and particularly preferably 7.5 or more. The upper limit of Mw/Mn in the second polypropylene resin is, for example, 11.0, 10.0, 9.0, or 8.5. The ratio of Mz to Mn (Mz/Mn) in the second polypropylene resin is preferably 30 or more and 40 or less, and more preferably 33 or more and 37 or less.

The second polypropylene resin preferably has a melt flow rate at 230° C. of less than 4.0 g/10 min, more preferably 3.9 g/10 min or less, and even more preferably 3.8 g/10 min or less. The melt flow rate at 230° ° C. is preferably 1.0 g/10 min or more, more preferably 1.5 g/10 min or more, and even more preferably 2.0 g/10 min or more.

The second polypropylene resin preferably has a heptane insoluble content of 97.5% or more, more preferably 98.0% or more, even more preferably more than 98.5%, and particularly preferably 98.6% or more. The heptane insoluble content is preferably 99.5% or less, and more preferably 99.0% or less.

The total ash content of the second polypropylene resin is preferably as low as possible for electrical properties. The total ash content is preferably 50 ppm or less, more preferably 40 ppm or less, and even more preferably 30 ppm or less, based on the second polypropylene resin. The lower limit of the total ash content is, for example, 2 ppm or 5 ppm.

The total amount of the first polypropylene resin and the second polypropylene resin can be, for example, 90 wt. % or more, 95 wt. % or more, or 100 wt. %, based on the entire polypropylene resin taken as 100 wt. %.

The polypropylene resin can be produced by a commonly known polymerization method. The polymerization method is not particularly limited as long as a polypropylene resin that can be used in the polypropylene film according to this embodiment can be produced. Examples of the polymerization method include vapor phase polymerization, bulk polymerization, and slurry polymerization.

The polymerization can be a single-stage (one-step) polymerization using a single polymerization reactor, or a multistage polymerization using at least two or more polymerization reactors. Further, the polymerization can also be carried out by adding hydrogen or a comonomer to the reactor as a molecular weight modifier.

The catalyst used in the polymerization is a commonly known Ziegler-Natta catalyst, and is not particularly limited as long as the polypropylene resin of the present invention can be obtained. The catalyst may contain an auxiliary catalyst component and a donor. The molecular weight, molecular weight distribution, etc. can be controlled by adjusting the catalyst and the polymerization conditions.

The molecular weight, molecular weight distribution, etc. of the polypropylene resin can be adjusted, for example, by appropriately selecting (i) the polymerization method and the conditions such as temperature and pressure during polymerization, (ii) the form of the reactor during polymerization, (iii) the presence or absence, type, and amount of additives, and (iv) the type and amount of catalyst.

Specifically, the molecular weight, molecular weight distribution, etc. of the polypropylene resin can be adjusted, for example, by a multistage polymerization reaction. An example of a method that uses a multistage polymerization reaction is described below.

First, in a first polymerization step, propylene and a catalyst are supplied to a first polymerization reactor. Together with these components, hydrogen as a molecular weight modifier is mixed in an amount necessary to attain a required polymer molecular weight. For example, in the case of slurry polymerization, the reaction temperature is about 70 to 100° C., and the residence time is about 20 to 100 minutes. Multiple reactors can be used, for example, in series. In this case, the polymerization product obtained in the first step is continuously sent to the next reactor together with additional propylene, a catalyst, and a molecular weight modifier. Subsequently, second polymerization is carried out to adjust the molecular weight to a lower molecular weight or a higher molecular weight than that in the first polymerization step. The yield (production output) of the first and second reactors can be adjusted to control the composition (formulation) of high-molecular-weight components and low-molecular-weight components.

The adjustment of the molecular weight, molecular weight distribution, etc. of the polypropylene resin can also be performed by peroxide decomposition. For example, a method comprising performing a peroxidation treatment with a decomposing agent, such as hydrogen peroxide or an organic peroxide, can be used.

When a peroxide is added to a disintegration-type polymer, such as polypropylene, a reaction of extracting hydrogen from the polymer occurs, and some of the resulting polymer radicals are recombined and undergo a crosslinking reaction, while most of the radicals undergo secondary decomposition (β cleavage) and are divided into two polymers having a lower molecular weight. Thus, a higher molecular weight component tends to decompose with a higher probability. This decomposition increases the amount of low-molecular-weight components and adjusts the configuration of molecular weight distribution.

When the content of a low-molecular-weight component is adjusted by blending (resin mixing), it is preferable that at least two or more resins having different molecular weights are dry-mixed or melt-mixed. In general, a mixed system of two types of polypropylenes obtained by mixing a primary resin with about 1 to 40 mass % of an additional resin having an average molecular weight higher or lower than that of the primary resin is preferably used, because it facilitates the adjustment of the amount of low-molecular-weight component.

In addition, in the case of the adjustment by mixing, the melt flow rate (MFR) can be used as an indicator of the average molecular weight. In this case, the MFR difference between the primary resin and the additional resin is preferably about 1 to 30 g/10 min, in terms of convenience in adjustment.

The polypropylene resin can be a commercially available product.

Metallized polypropylene film Y may further contain one or more resins other than polypropylene resins (hereinafter also referred to as "other resins"). The "other resins" are not particularly limited, as long as they are generally resins other than polypropylene resins, and the intended polypropylene film can be obtained. Examples of other resins include polyolefins other than polypropylenes, such as polyethylene, poly(1-butene), polyisobutene, poly(1-pentene), and poly(1-methylpentene); copolymers of α-olefins, such as ethylene-propylene copolymers, propylene-butene copolymers, and ethylene-butene copolymers; vinyl monomer-diene monomer random copolymers, such as styrene-butadiene random copolymers; vinyl monomer-diene monomer-vinyl monomer random copolymers, such as styrene-butadiene-styrene block copolymers; and the like. The polypropylene film of the present invention can contain such other resins in an amount that does not adversely affect the desired polypropylene film. The polypropylene resin film may contain other resins in an amount of preferably 10 parts by weight or less, and more preferably 5 parts by weight or less, based on 100 parts by weight of the polypropylene resin. The polypropylene resin film may contain other resins in an amount of preferably 0.1 parts by weight or more, and more preferably 1 part by weight or less, based on 100 parts by weight of the polypropylene resin.

The polypropylene resin of the present invention may further contain one or more additives in addition to the resin component. The "additives" are not particularly limited, as long as they are generally used for polypropylene resins, and the desired polypropylene film can be obtained. Examples of additives include nucleating agents (α-crystal nucleating agents and β-crystal nucleating agents); necessary stabilizing agents, such as antioxidants, chlorine absorbers, and ultraviolet absorbers; lubricants, plasticizers, flame retardants, antistatic agents, inorganic fillers, organic fillers, and the like. Examples of inorganic fillers include barium titanate, strontium titanate, and aluminum oxide. When such additives are used, polypropylene resin of the present invention can contain such additives in an amount that does not adversely affect the desired polypropylene film. Examples of usable additives include various additives used in polypropylene films for capacitors.

Figure 4:
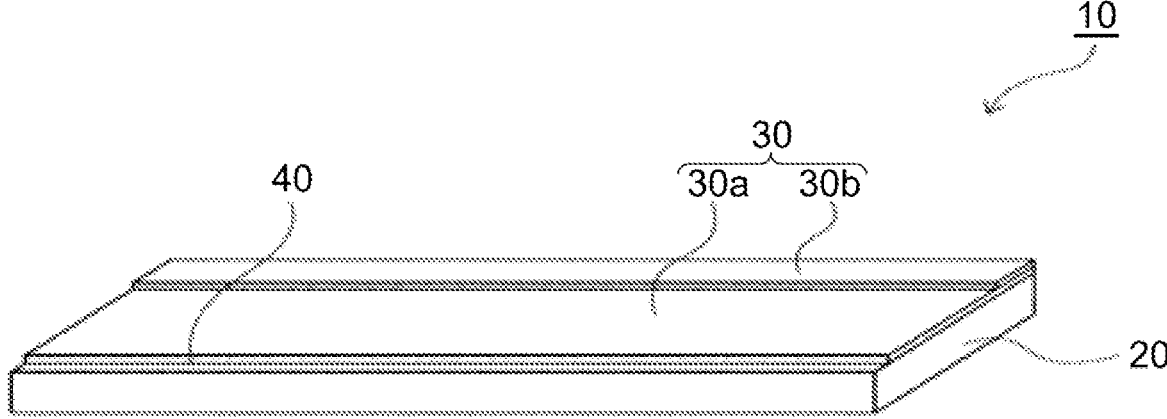
FIG. 4 is a schematic perspective view for illustrating metal layer-integrated polypropylene films produced as Examples and Comparative Examples.

FIG. 4 is a schematic perspective view of a metal layer-integrated polypropylene film 10 to illustrate an embodiment of metallized polypropylene film Y. As shown in FIG. 4, the metal layer-integrated polypropylene film 10 comprises a biaxially stretched polypropylene film 20 and a metal deposition electrode 30 stacked on the biaxially stretched polypropylene film 20 so as to leave, at one end in the width direction of the film, an insulation margin 40 (insulation groove; the length in the width direction not being particularly limited as long as the area of the metal deposition electrode 30 does not become so small that the capacitance is significantly impaired when the film is used for a capacitor; the length in the width direction being, for example, 2 mm or more) that is continuous in the longitudinal direction of the film. The metal deposition electrode 30 includes a metal deposition layer 30a stacked on the biaxially stretched polypropylene film 20 so as to be in direct contact with the biaxially stretched polypropylene film 20, and an electrode extraction portion 30b formed on a part of the top surface of the metal deposition layer 30a. The metal deposition layer 30a functions as an electrode when the metal layer-integrated polypropylene film is used as a capacitor. The electrode extraction portion 30b is a portion called "heavy edge."

The metal used in each of the metal deposition layer 30a and the electrode extraction portion 30b can be, for example, a single metal, such as zinc, lead, silver, chromium, aluminum, copper, or nickel, or a mixture of several kinds of these metals, or an alloy thereof. However, zinc and aluminum are preferred in consideration of, for example, the environment, economical efficiency, and capacitor performance.

The layer structure of the metal layer is not particularly limited. The metal layer may be a single layer consisting of one layer, or may be multiple layers having the same or different compositions.

The thickness of the metal deposition layer 30a and the thickness of the electrode extraction portion 30b are controlled by the film resistance (resistance per unit area; unit: $\Omega$/sq). Resistance is inversely proportional to thickness. Thus, the lower the film resistance, the thicker the film.

When the metal layer-integrated polypropylene film 10 is used as a capacitor, insulation breakdown may occur at sites of the metal layer-integrated polypropylene film 10 with a low voltage resistance. When insulation breakdown occurs, heat is generated instantaneously; thus, the metal deposition layer 3a evaporates, and insulation is restored (self-healing). Evaporation of the metal deposition layer 30a (occurrence of self-healing) restores the function of the capacitor, allowing the capacitor to be continuously used.

The ease of evaporation (ease of occurrence of self-healing) of the metal deposition layer 30a varies depending on the film resistance (film thickness). The film resistance of the metal deposition layer 30a is preferably 1 $\Omega$/sq or more, and more preferably 5 $\Omega$/sq or more. A film resistance of less than 1 $\Omega$/sq is not preferable because it is difficult for evaporation of the metal deposition layer 30a to occur (it is difficult for self-healing to occur), thus increasing the risk of leakage currents due to insulation breakdown and ignition due to heat generation.

The film resistance of the metal deposition layer 30a is preferably 30 $\Omega$/sq or less, and more preferably 27 $\Omega$/sq or less. A film resistance of more than 30 $\Omega$/sq is not preferable because evaporation of the metal deposition layer 30a tends to occur easily (self-healing tends to occur easily), thus significantly decreasing the capacitance of the capacitor.

The film resistance of the electrode extraction portion 30b (heavy edge) is preferably 1 $\Omega$/sq or more and 7 $\Omega$/sq or less, and more preferably 2 $\Omega$/sq or more and 6 $\Omega$/sq or less.

In metallized polypropylene film Y, the polypropylene film is preferably biaxially stretched, as described above.

The biaxially stretched polypropylene film can be produced by a commonly known method for producing biaxially stretched polypropylene films. For example, the biaxially stretched polypropylene film can be produced by producing a cast sheet from a polypropylene resin composition obtained by mixing a first polypropylene resin and a second polypropylene resin, or a first polypropylene resin, optionally with other resins, additives, etc., and then biaxially stretching the cast sheet.

In an embodiment of metallized polypropylene film Y, it is preferable to, for example, set the heat-melting temperature in the production of the cast sheet to a relatively high temperature, set the cooling drum temperature in the production of the cast sheet to a relatively high temperature, set the longitudinal stretching temperature to a relatively high temperature, and appropriately adjust other stretching conditions, as described later. Further, in an embodiment of metallized polypropylene film Y, it is preferable to, for example, set the heat-melting temperature in the production of the cast sheet to a relatively high temperature, and set the cooling drum temperature in the production of the cast sheet or the longitudinal stretching temperature to a relatively high temperature.

The method for preparing the polypropylene resin composition is not particularly limited. Examples of the method include a method comprising dry-blending a polymer powder or pellets of the first polypropylene resin and the second polypropylene resin, or the first polypropylene resin, optionally with other resins, additives, etc. using a mixer or the like; and a method comprising supplying a polymer powder or pellets of the first polypropylene resin and the second polypropylene resin, or the first polypropylene resin, optionally together with other resins, additives, etc. to a kneader, followed by melting and kneading to thereby obtain a melt-blended resin composition.

The mixer and kneader are not particularly limited. The kneader can be any of a single-screw type kneader, a two-screw type kneader, or a multi-screw type kneader having three or more screws. When a kneader having two or more screws is used, the type of kneading may be rotation in the same direction or different directions.

In the case of blending by melting and kneading, the kneading temperature is not particularly limited as long as sufficient kneading is achieved. The temperature is preferably within a range of 170 to 320° C., more preferably within a range of 200° ° C. to 300° ° C., and even more preferably within a range of 230° C. to 270° C. In order to prevent resin degradation during kneading and mixing, the kneader may be purged with an inert gas, such as nitrogen. The molten kneaded resin may be pelletized into a suitable size using a commonly known pelletizer. As a result, melt-blended resin composition pellets can be obtained.

In the preparation of the polypropylene resin composition, a primary agent as an antioxidant described in the above item of additives can be added, for the purpose of inhibiting thermal degradation and oxidative degradation in an extruder.

When the polypropylene resin composition contains a primary agent, the content thereof is preferably 1000 mass ppm to 5000 mass ppm based on the mass of the resin components (the mass of the resin components as a whole). The antioxidant for this purpose is mostly consumed during a formation step in an extruder and hardly remains in the film after the film formation.

The hindered phenol-based antioxidant having a carbonyl group described in the above item of additives can be added as a secondary agent to the polypropylene resin composition.

When the polypropylene resin composition contains a hindered phenol-based antioxidant having a carbonyl group, the content thereof is preferably 100 mass ppm to 10000 mass ppm, and more preferably 3000 mass ppm to 7000 mass ppm, based on the mass of the resin components (the mass of the resin components as a whole). A considerable amount of the hindered phenol-based antioxidant having a carbonyl group is also consumed in the extruder.

When the polypropylene resin composition does not contain the primary agent, a larger amount of the hindered phenol-based antioxidant having a carbonyl group can be used. This is because the amount of the hindered phenol-based antioxidant having a carbonyl group consumed in the extruder increases. When the polypropylene resin composition does not contain the primary agent but contains the hindered phenol-based antioxidant having a carbonyl group, the content thereof is 4000 mass ppm to 8000 mass ppm or less based on the mass of the resin components (the mass of the resin components as a whole).

The cast sheet can be obtained in such a manner that pellets of a dry-blended resin composition and/or a melt-blended resin composition produced in advance are supplied to an extruder, heat-melted, passed through a filtration filter, heat-melted at a relatively high temperature, preferably 255° C. to 320° ° C., more preferably 260° C. to 300° C., and even more preferably 265 to 280° ° C., melt-extruded from a T-die, and cooled and solidified with at least one or more metal drums kept at a relatively high temperature, preferably 96° C. to 120° C., more preferably 96° C. to 110° C., and even more preferably 96 to 100° C. (cast temperature). At this time, it is preferable to press the molten-extruded resin composition against the metal drum with an air knife. The surface in contact with the metal drum is a first surface, and the opposite surface (on the air knife side) is a second surface.

The thickness of the cast sheet is not particularly limited as long as the target polypropylene film can be obtained, and is preferably 0.05 mm to 2 mm, and more preferably 0.1 mm to 1 mm.

In the production process of the cast sheet (particularly in the extruder), polypropylene is more or less subjected to thermal degradation (oxidative degradation) and shear degradation. The degree of progress of such degradation, i.e., changes in the molecular weight distribution and stereoregularity, can be suppressed by nitrogen purge in the extruder (suppression of oxidation), the shape of the screw in the extruder (shear force), the internal shape of the T-die during casting (shear force), the amount of antioxidant added (suppression of oxidation), winding speed during casting (extension force), and the like.

In metallized polypropylene film Y, the biaxially stretched polypropylene film can be produced by stretching the cast sheet. The stretching method is preferably a sequential biaxial stretching method. In the sequential biaxial stretching method, first, the cast sheet is kept at a relatively high temperature, preferably 142 to 180° C., more preferably 143 to 160° C., and even more preferably 144 to 150° C., passed through rolls with a speed difference, stretched preferably 3- to 7-fold, and more preferably 4- to 6-fold, in the machine direction, and immediately cooled to room temperature. Subsequently, the stretched film is guided to a tenter, transversely stretched 3 to 11-fold (preferably 8- to 11-fold) in the width direction at a temperature of preferably 150 to 160°

C., more preferably 150 to 159° C., even more preferably 150 to 158° C., and still even more preferably 150 to 157° C., then relaxed and heat-fixed, and wound into a roll.

The longitudinal stretching speed is preferably 100 to 100000%/sec, more preferably 1000 to 80000%/sec, even more preferably 60000 to 70000%/sec, and still even more preferably 65000 to 70000%/sec. The transverse stretching speed is preferably 10 to 800%/sec, more preferably 100 to 600%/sec, even more preferably 300 to 400%/sec, and still even more preferably 300 to 350%/sec.

The film wound into a roll is subjected to aging treatment in an atmosphere of about 20 to 45° C., and then slit (cut) into a desired product width by a slitter or the like while being unwound (fed out), and each is wound again.

This stretching step results in a film with excellent mechanical strength and stiffness.

After completion of the stretching and heat-fixing steps, the polypropylene film is preferably subjected to corona discharge treatment on-line or off-line. By performing the corona discharge treatment, it is possible to improve adhesion properties in subsequent steps, such as a metal deposition step. The corona discharge treatment can be performed by using a known method. It is preferable to use air, carbon dioxide gas, nitrogen gas, or a mixed gas thereof as the atmospheric gas.

Metallized polypropylene film Y can be obtained, for example, by a method comprising stacking a metal layer on one or both sides of the polypropylene film of the present invention. Examples of the method for stacking a metal layer on one or both sides of the polypropylene film of the present invention include vacuum deposition methods and sputtering methods. Vacuum deposition methods are preferable, in terms of, for example, productivity and economical efficiency. Examples of vacuum deposition methods generally include crucible methods, wire methods, and the like. The method is not particularly limited, and an optimal method can be suitably selected.

In vacuum deposition methods, the thickness of the metal layer is controlled by film resistance. As deposition conditions in vacuum deposition methods, the film resistance of the metal deposition layer $3a$ is preferably $1\Omega/\square\Omega/sq$ or more, and more preferably $5\Omega/\square\Omega/sq$ or more. The film resistance of the metal deposition layer $3a$ is also preferably $30\Omega/\square\Omega/sq$ or less, and more preferably $27\Omega/\square\Omega/sq$ or less.

The film resistance of the electrode extraction portion $3b$ (heavy edge) is preferably $1\ \Omega/\square\Omega/sq$ or more and $7\Omega/\square\Omega/sq$ or less, and more preferably $2\Omega/\square\Omega/sq$ or more and $6\Omega/\square\Omega/sq$ or less.

When a metal layer is formed by vapor deposition, the margin pattern is not particularly limited. From the viewpoint of improving properties such as the fail-safe ability of the capacitor, it is preferable that a pattern containing a so-called special margin, such as a fishnet pattern or a T-margin pattern, is applied to one surface of the film. This enhances the fail-safe ability and is effective in terms of preventing the breakage and short-circuit of the capacitor.

The method for forming a margin can be a commonly known method, such as a tape method or an oil method, which can be used with no restrictions.

After a metal layer is stacked on one or both sides of metallized polypropylene film Y, post-heat treatment may be further performed. Conditions for post-heat treatment include, for example, application of silicon oil heated to 120 to 130° C.

Figure 5:
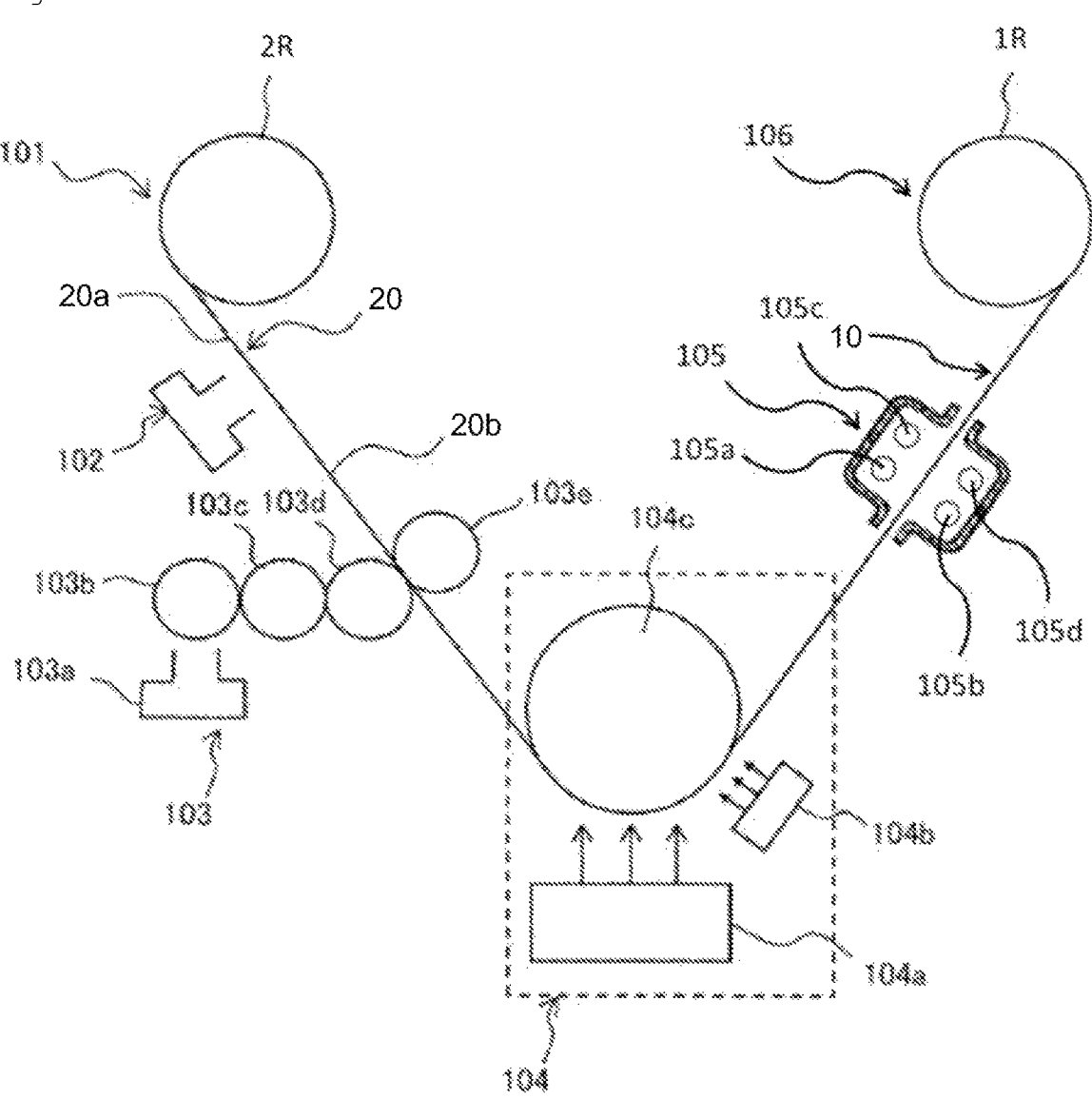
FIG. 5 is a schematic diagram for illustrating a method for producing the metal layer-integrated polypropylene films of the Examples and Comparative Examples.

Referring to FIG. 5, a preferred method for producing the metal layer-integrated polypropylene film (metallized polypropylene film Y) of the present invention is described below. The cumulative insulation breakdown point density can be suppressed by controlling the vapor deposition conditions (mainly the voltage speed ratio per unit width of the cooling roll and the electrical discharge amount) as described later.

FIG. 5 is a schematic diagram for explaining the method for producing the metal layer-integrated polypropylene film. It is preferred that the metal layer-integrated polypropylene film is produced by the production apparatus described below. As shown in FIG. 5, the production apparatus for the metal layer-integrated polypropylene film includes a dielectric film supply portion 101, an insulation margin forming portion 102, a special deposition pattern margin forming portion 103, a metal deposition portion 104, a DC magnetron discharge electrode 105, and a metal layer-integrated film winding portion 106.

The dielectric film supply portion 101 supports a biaxially stretched polypropylene film roll 2R obtained by winding a biaxially stretched polypropylene film 20, and supplies the biaxially stretched polypropylene film 2. The biaxially stretched polypropylene film 20 supplied from the biaxially stretched polypropylene film roll 2R is conveyed to the insulation margin forming portion 102.

The insulation margin forming portion 102 applies oil to a metal deposition surface $20a$ of the biaxially stretched polypropylene film 20 in a pattern corresponding to the pattern of the insulation margin 4 to form an oil mask. The oil mask is provided to prevent, in the vapor deposition process, metal particles from adhering to the portion serving as the insulation margin in the metal layer-integrated polypropylene film 10. The insulation margin forming portion 102 vaporizes oil stored in an oil tank and directly applies the oil to the metal deposition surface $20a$ of the polypropylene film 2 from a nozzle (slit) in the tank to form an oil mask.

The special deposition pattern margin forming portion 103 applies oil to the metal deposition surface $20a$ of the biaxially stretched polypropylene film 2 in a pattern substantially corresponding to the electrode pattern of the metal deposition layer $30a$ to form an oil mask. The oil mask is provided to prevent, in the vapor deposition process, metal particles from adhering to the portions serving as the vertical margins and the transverse margins in a metal layer-integrated polypropylene film 1. The special deposition pattern margin forming portion 103 includes an oil tank $103a$, an anilox roll $103b$, a transfer roll $103c$, a plate roll $103d$, and a backup roll $103e$. The oil tank $103a$ vaporizes the stored oil and sprays it from a nozzle. The anilox roll $103b$ and the transfer roll $103c$ rotate in a state in which the oil sprayed from the nozzle of the oil tank $103a$ adheres to the outer peripheral surfaces of these rolls. The backup roll $103e$ faces the plate roll $103d$ through the polypropylene film 2 and abuts on the cooling roll contact surface $20b$ of the biaxially stretched polypropylene film 2.

The biaxially stretched polypropylene film 20 that has passed through the insulation margin forming portion 102 and the special deposition pattern margin forming portion 103 is conveyed to the deposition portion 104.

The deposition portion 104 includes metal vapor generating portions $104a$ and $104b$, and a cooling roll $104c$ facing the metal vapor generating portions $104a$ and $104b$ through the biaxially stretched polypropylene film 20. The metal vapor generating portion $104a$ generates metal vapor by supplying a wire of a metal that is the material of the metal deposition layer $30a$, on a boat heated by applying an electric current, and deposits the metal vapor on the metal deposition surface $20a$ of the biaxially stretched polypropylene film 20. The metal vapor generating portion 104*b* heats and evaporates a metal that is the material of the electrode extraction portion 3*b*, to generate metal vapor, and deposits it on the metal deposition layer 30*a* previously formed on the metal deposition surface 20*a* of the biaxially stretched polypropylene film 20 by the metal vapor generating portion 104*a*. The metal deposition layer of the electrode extraction portion 30*b* is thereby thicker than the metal deposition layer of the other portion; accordingly, a heavy edge structure is formed. The metal vapor generated in the metal vapor generating portions 104*a* and 104*b* adheres to portions other than the oil mask formed on the metal deposition surface 20*a* of the biaxially stretched polypropylene film 20 to thereby form a metal deposition electrode 30.

Voltage is applied to the cooling roll 104C, and due to the voltage application, the cooling roll contact surface 20*b* of the biaxially stretched polypropylene film 20 is closely attached to the cooling roll 104C to cool the biaxially stretched polypropylene film 20. The degree of adhesion of the cooling roll contact surface 2*b* to the cooling roll 104C is proportional to the voltage (V) applied to the cooling roll 104C and is inversely proportional to the width (m) of the cooling roll and the deposition speed (m/min). Thus, the higher the voltage speed ratio per unit width of the cooling roll (unit: V·min/m$^2$), the more closely the cooling roll contact surface 2*b* of the biaxially stretched polypropylene film 20 is attached to the cooling roll 104C, which increases cooling efficiency and prevents damage from the heat of the deposition metal. The voltage speed ratio per unit width of the cooling roll is preferably 0.20 V·min/m$^2$ or more and 0.45 V·min/m$^2$ or less. If the voltage speed ratio per unit width of the cooling roll is less than 0.20 V·min/m$^2$, the cooling roll contact surface 20*b* of the biaxially stretched polypropylene film 2 is not closely attached to the cooling roll 104C sufficiently, resulting in poor cooling efficiency and thermal damage to the biaxially stretched polypropylene film 20 or the metal layer-integrated polypropylene film 10; as a result, the voltage resistance of the metal layer-integrated polypropylene film 1 decreases, and when the film is used as a capacitor, the lifetime of the capacitor decreases due to insulation breakdown and heat generation. If the voltage speed ratio per unit width of the cooling roll is more than 0.45 V·min/m$^2$, the cooling roll contact surface 20*b* of the biaxially stretched polypropylene film 20 is closely attached to the cooling roll 104C sufficiently to improve cooling efficiency and reduce thermal damage to the biaxially stretched polypropylene film 20 or the metal layer-integrated polypropylene film 10; however, electrical discharge is likely to occur between the biaxially stretched polypropylene film 20 and the roll 104C, or between the metal layer-integrated polypropylene film 1 and the roll 104C. If electrical discharge occurs, the biaxially stretched polypropylene film 20 or the metal layer-integrated polypropylene film 10 is damaged by electrical damage. Even if no electrical discharge occurs, the metal layer-integrated polypropylene film 10 becomes easily charged, and electrical damage is caused by discharge of static electricity of the metal layer-integrated polypropylene film 10 when the film is wound into a roll at the metal layer-integrated film winding portion 106, causing damage to the metal layer-integrated polypropylene film 10. If the biaxially stretched polypropylene film 20 or the metal layer-integrated polypropylene film 10 is damaged by electrical damage, the voltage resistance decreases, and the lifetime is likely to decrease due to insulation breakdown and heat generation when the film is used as a capacitor. Moreover, if the metal layer-integrated polypropylene film 10 is charged, the sliding properties are reduced, and thus wrinkles are likely to occur in the winding process in the metal layer-integrated film winding portion 106, or in the element winding process in the production of a capacitor. Further, in the press processing after element winding in the production of a capacitor, buckling tends to easily occur due to the reduction in the sliding properties due to charging. Wrinkles and buckling are undesirable because they damage the metal layer-integrated polypropylene film 1, causing a decrease in the lifetime of a capacitor due to insulation breakdown and heat generation. The voltage speed ratio per unit width of the cooling roll is more preferably 0.24 V·min/m$^2$ or more and 0.41 V·min/m$^2$ or less.

The temperature of the cooling roll 104C is preferably −18° C. or less, and more preferably −19° C. or less, from the viewpoint of preventing thermal damage to the biaxially stretched polypropylene film 20 or the metal layer-integrated polypropylene film 1.

The metal layer-integrated polypropylene film 1 formed by forming the metal deposition electrode 3 on the biaxially stretched polypropylene film 20 in the deposition portion 104 passes through a static elimination portion 105. The static elimination portion 105 includes DC magnetron discharge electrode portions 105*a*, 105*b*, 105*c*, and 105*d*, and by supplying power to the DC magnetron discharge electrode portions 105*a*, 105*b*, 105*c*, and 105*d* while argon gas is supplied, ions of argon gas are generated. When the metal layer-integrated polypropylene film 1 passes through the static elimination portion 105 in a state in which ions of argon gas are generated, the ions of argon gas neutralize static electricity of the metal layer-integrated polypropylene film 1 to prevent a metal layer-integrated polypropylene film roll 1R from being charged. The degree of neutralization of static electricity of the metal layer-integrated polypropylene film 10 by the ions of argon gas can be expressed by the electrical discharge amount. The electrical discharge amount is proportional to the total power (W) of the DC magnetron discharge electrode portions 105*a*, 105*b*, 105*c*, and 105*d*, and is inversely proportional to the width (m) of the DC magnetron discharge electrode portion and the deposition speed (m/min). The width of each of the DC magnetron discharge electrode portions 105*a*, 105*b*, 105*c*, and 105*d* is the same, and the above-stated width (m) of the DC magnetron discharge electrode portion is the width per electrode portion, rather than the total width of the DC magnetron discharge electrode portions 105*a*, 105*b*, 105*c*, and 105*d*. The electrical discharge amount is preferably 1.5 W·min/m$^2$ or more and 3.7 W·min/m$^2$ or less. If the electrical discharge amount is more than 3.7 W·min/m$^2$, the electrical discharge of the DC magnetron discharge electrode portions 105*a*, 105*b*, 105*c*, and 105*d* becomes overly strong, causing electrical damage to the metal layer-integrated polypropylene film 10. Even if no electrical discharge occurs, the metal layer-integrated polypropylene film 10 is charged by ions of argon gas. If the electrical discharge amount is less than 1.5 W·min/m$^2$, the neutralization of static electricity in the metal layer-integrated polypropylene film 10 is insufficient, and the film is charged. If the metal layer-integrated polypropylene film 1 is damaged by electrical damage, the voltage resistance decreases, and the lifetime is likely to decrease due to insulation breakdown and heat generation when the film is used as a capacitor. If the metal layer-integrated polypropylene film 10 is charged, electrical damage is caused by discharge of static electricity of the metal layer-integrated polypropylene film 10 when the film is wound into a roll at the metal layer-integrated film winding portion

106, causing damage to the metal layer-integrated polypropylene film 10. If the metal layer-integrated polypropylene film 10 is damaged, the voltage resistance decreases, and the lifetime is likely to decrease due to insulation breakdown and heat generation when the film is used as a capacitor. Moreover, if the metal layer-integrated polypropylene film 10 is charged, the sliding properties are reduced, and thus wrinkles are likely to occur in the winding process in the metal layer-integrated film winding portion 106, or in the element winding process in the production of a capacitor. Further, in the press processing after element winding in the production of a capacitor, buckling tends to easily occur due to the reduction in the sliding properties due to charging. Wrinkles and buckling are undesirable because they damage the metal layer-integrated polypropylene film 10, causing a decrease in the lifetime of a capacitor due to insulation breakdown and heat generation. The electrical discharge amount is more preferably 1.9 W·min/m$^2$ or more and 3.3 W·min/m$^2$ or less.

The metal layer-integrated polypropylene film 10 that has passed through the static elimination portion 105 is conveyed to and wound on the metal layer-integrated film winding portion 106 to obtain the metal layer-integrated polypropylene film roll 1R.

The metal layer-integrated polypropylene film 10 can be obtained by forming the metal deposition electrode 3 on the metal deposition surface 20*a* of the polypropylene film 20 using the production apparatus described above.

5. Capacitor

A capacitor (capacitor element) can be formed using metallized polypropylene film X or metallized polypropylene film Y (metal layer-integrated polypropylene film) of the present invention. The configuration of the capacitor is not particularly limited as long as the capacitor comprises the metallized polypropylene film of the present invention.

In the step of producing the capacitor, film winding processing is performed. For example, a pair of metallized polypropylene films of the present invention are stacked and wound so that the metal film and the biaxially stretched polypropylene film of the metallized polypropylene film of the present invention are alternately overlaid and further so that the insulation margin of each film is located, one on one side, and the other on the other side. In this step, it is preferable to stack a pair of metallized polypropylene films with a shift of 1 to 2 mm. The winder to be used is not particularly limited. For example, a 3KAW-N2 automatic winder produced by Kaido Manufacturing Co., Ltd. can be used.

In preparing a flat capacitor, after the winding, the obtained roll is typically pressed. Pressing helps to tighten the roll of the capacitor and/or form the element. From the viewpoint of controlling and/or stabilizing the gap between the layers, the applied pressure is, for example, 2 to 20 kg/cm$^2$, although the optimum value varies depending on, for example, the thickness of the metallized polypropylene film. Subsequently, molten metal is sprayed on both edge faces of the roll to form metallikon electrodes, thereby preparing a capacitor. Thereafter, the capacitor may be subjected to a predetermined heat treatment. For example, the capacitor may be subjected to a heat treatment under ordinary pressure or vacuum at a temperature of 80 to 125° C. for 1 hour or more (which may be referred to below as "heat aging").

In the step of subjecting the capacitor to a heat treatment, the heat treatment temperature is typically 80° C. or more, and preferably 90° C. or more. The heat treatment temperature is also typically 130° C. or less, and preferably 125° C.

or less. The heat treatment of the capacitor reduces the gap between the films constituting the capacitor formed from the metallized polypropylene film, thereby suppressing corona discharge and facilitating the crystallization due to the alteration of the internal structure of the metallized film. This results in improving the voltage resistance of the capacitor.

Examples of the method for performing the heat treatment on the capacitor include a method using a constant-temperature chamber in a vacuum atmosphere, a method using high-frequency induction heating, and the like. It is preferable to use a method using a constant-temperature chamber. The time for performing the heat treatment is preferably 1 hour or more, and more preferably 10 hours or more, in terms of obtaining mechanical and thermal stability. In terms of preventing defects in molding such as heat wrinkles and patterning, the time is more preferably 20 hours or less.

Leads are typically welded to the metallikon electrodes of a capacitor that has undergone heat aging. The capacitor is preferably encapsulated in a case and potted in epoxy resin to impart weatherability to the capacitor and, in particular, to prevent degradation of the capacitor by moisture.

The capacitor obtained using metallized polypropylene film X or metallized polypropylene film Y of the present invention has excellent voltage resistance, durability, and reliability.

EXAMPLES

Examples of Metallized Polypropylene Film X and Comparative Examples

Metallized polypropylene film X of the present invention is described in more detail below with reference to Examples. However, the present invention is not limited to the Examples.

Comparative Example 1a

Polypropylene resin pellets (resin pellets obtained by mixing PP resin A1 [MW=320000, Mw/Mn=9.3, mesopentad fraction [mmmm]=95%, produced by Prime Polymer Co., Ltd.] and PP resin A2 [Mw=350000, Mw/Mn=7.7, mesopentad fraction [mmmm]=96.5%, produced by Korea Petro Chemical Ind. Co., Ltd.] at a mass ratio of 67:33) were supplied to an extruder and melted at a temperature of 230° C., and the melt was passed through a polymer filter having a mesh size of 30 μm. The melt that had been passed through the polymer filter was extruded through a T-die and wound around a metal drum kept at a surface temperature of 96° C. for solidification, thereby producing a cast sheet having a thickness of about 138 μm. The cast sheet was stretched 5-fold in the machine direction at a temperature of 146° C., immediately cooled to room temperature, and then stretched with a tenter 10-fold in the transverse direction at a temperature of 165° C. to obtain a biaxially stretched polypropylene film having a thickness of 2.3 μm. Subsequently, a metal layer was stacked on the biaxially stretched polypropylene film by a known method using a vapor deposition apparatus to obtain a metallized polypropylene film. Vapor Deposition was performed at a cooling roll temperature of −23° C., a film resistance of 20Ω/□, and a film conveyance speed of 150 m/min.

Comparative Example 2a

A metallized polypropylene film was obtained in the same manner as in Comparative Example 1a, except that the mesh size of the polymer filter was 20 μm.

Example 1a

Metallized polypropylene film X was obtained in the same manner as in Comparative Example 1a, except that the mesh size of the polymer filter was 10 μm.

Example 2a

Metallized polypropylene film X was obtained in the same manner as in Comparative Example al, except that the mesh size of the polymer filter was 5 μm.

Comparative Example 3a

A metallized polypropylene film was obtained in the same manner as in Comparative Example 1a, except that PP resin B (Mw=340000, Mw/Mn=6.3, mesopentad fraction=98%, produced by Prime Polymer Co., Ltd.) was used in place of the polypropylene resin pellets.

Comparative Example 4a

A metallized polypropylene film was obtained in the same manner as in Comparative Example 2a, except that PP resin B was used in place of the polypropylene resin pellets.

Comparative Example 5a

A metallized polypropylene film was obtained in the same manner as in Example 1a, except that PP resin B was used in place of the polypropylene resin pellets.

Comparative Example 6a

A metallized polypropylene film was obtained in the same manner as in Example 2a, except that PP resin B was used in place of the polypropylene resin pellets.

Method for Measuring Number of Insulation Breakdown Points

A conductive substrate was formed by stacking a brass plate (320 mm×250 mm), a conductive rubber (280 mm×150 mm), and an aluminum foil (280 mm×150 mm) in this order. An insulating film (polypropylene sheet, external dimensions: 280 mm×150 mm, thickness: 22 μm) with a quadrangular (100 mm×10 mm) aperture portion (referred to below as the "aperture" or "aperture portion") in the center thereof was placed on the aluminum foil-side surface of the conductive substrate. Subsequently, a metallized polypropylene film for measurement was placed on the insulating film to prepare a stack. The metallized polypropylene film for measurement was placed so that it was brought into contact with the entire surface of the exposed conductive substrate (specifically, the aluminum foil of the conductive substrate) through the aperture portion and so that the metal deposition surface of the metallized polypropylene film was exposed to the surface side. Then, a cylindrical brass electrode (diameter: 25 mm, and height: 65 mm) was placed on the exposed metal deposition surface.

Thereafter, the brass plate of the conductive substrate and the brass electrode were electrically connected by a DC power source. After a voltage of 900 V (391 (V/μm)) (start voltage) was applied at 20° ° C. for 1 minute, the number of insulation breakdown points in the region of the metallized polypropylene film for measurement placed in the aperture portion was visually counted. When insulation breakdown occurs in the metallized polypropylene film, portions in which insulation breakdown occurs are visually recognized as cloudy compared with a portion in which insulation breakdown does not occur. Thus, such portions were regarded as insulation breakdown points, and the number of insulation breakdown points was counted. After counting, a voltage of 1000 V was applied for 1 minute, and the number of insulation breakdown points was visually counted in the same manner. The voltage was then increased in increments of 100 V (i.e., 435 (V/μm), 478 (V/μm), 521 (V/μm), 565 (V/μm), and 609 (V/μm) being applied in this order), the number of insulation breakdown points when each voltage was applied for 1 minute was visually counted, and application of all of the voltages was completed.

After application of all of the voltages was completed, the cumulative number of insulation breakdown points generated up to the third voltage application (1100 V, 478 (V/μm)) was divided by the area of the aperture portion (100 mm×10 mm=10 cm$^2$) to take the resulting value as the number of insulation breakdown points (points/cm$^2$) of the metallized polypropylene film. The number of insulation breakdown points (points/cm$^2$) was multiplied by the thickness of the metallized polypropylene film (2.3 μm) to take the resulting value as the number of insulation breakdown points multiplied by thickness (points/cm$^2$·μm) of the metallized polypropylene film.

Method for Measuring Total Volume of Protrusions

The total volume of protrusions was determined by measuring the surface profile by a three-dimensional surface roughness evaluation method with a light interferometric non-contact surface profiler. Specifically, the total volume of protrusions was measured using a VertScan 2.0 (model: R5500GML) produced by Ryoka Systems Inc. as a light interferometric non-contact surface profiler. The measurement was performed in WAVE mode using a 530 white filter and an ×20 objective lens in 10 randomly selected portions of the film surface per visual field of 240 μm×180 μm. After the obtained data were subjected to noise cancellation processing by a median filter, Gaussian filtering with a cutoff value of 30 μm was performed to remove waviness components.

Test Method for Short-Time Pressure Test

The initial capacitance of capacitors produced using the metallized polypropylene films obtained in the Examples and Comparative Examples was measured with an LCR HiTESTER 3522-50 (produced by Hioki E.E. Corporation) before the test. Next, a DC voltage of 1000 V was applied to the capacitors at room temperature for 10 seconds. The capacitance of the capacitors after voltage application was measured in the same manner, and the change in capacitance before and after the test was calculated by using the following formula.

Capacitance change=[(capacitance after voltage application)−(initial capacitance)]/(initial capacitance)×100(%)

Subsequently, a DC voltage of 1050 V was applied for 10 seconds, and the capacitance was measured in the same manner. The voltage was increased in increments of 50 V, and this operation was repeated until the capacitance change exceeds −1% to cumulatively apply voltages. The voltage at which the capacitance change is −1% was determined by linear interpolation (interpolation) from the voltages before and after the capacitance change exceeds −1%. The test was conducted using two samples, and their average value was calculated.

The method for measuring capacitance was as follows. A 4-terminal probe 9140 was attached to an LCR HiTESTER 3522-50 (produced by Hioki E.E. Corporation). The two terminals (leads) of a capacitor were pinched with the 4-terminal probe 9140, and an alternating voltage of 0.1 V, 1 kHz was applied from the built-in power source of the LCR HiTESTER 3522-50. When the displayed value settled, the capacitance value was read. The measurement conditions other than those described here were according to "4.2.2 Capacitance" of JIS C 5101-16:2009.

Measurement Results

Table 1 shows the thickness of the metallized polypropylene films and the measurement conditions and results of the number of insulation breakdown points of the metallized polypropylene films. Table 1 also shows the measurement results of the total volume of protrusions, evaluation results of discharge stability, and results of the short-time pressure test of the metallized polypropylene films. In Table 1, V1 means the first voltage (start voltage (V)), D1 means the thickness of the metallized polypropylene films (μm), and Vn means the end voltage (sixth applied voltage).

(1) Preparation of Polypropylene Resins

Table 1 shows polypropylene resins used to produce the biaxially stretched polypropylene films of the Examples of metallized polypropylene film Y and Comparative Examples.

Resin A shown in Table 1 is a product of Prime Polymer Co., Ltd. Resin B is S802M produced by Korea Petro Chemical Ind. Co., Ltd. Resins A and B are both linear homopolypropylene resins.

Table 1 shows the number average molecular weight (Mn), weight average molecular weight (Mw), z-average molecular weight (Mz), molecular weight distribution (Mw/Mn), molecular weight distribution (Mz/Mn), melt flow rate (MFR), and heptane insoluble content (HI) of the linear homopolypropylene resins. These are values in the form of raw material resin pellets. The measurement methods are as shown below.

(1-1) Measurement of Number Average Molecular Weight (Mn), Weight Average Molecular Weight (Mw), Z-Average Molecular Weight (Mz), Molecular Weight Distribution (Mw/Mn), and Molecular Weight Distribution (Mz/Mn) of Linear Polypropylene Resins The number average molecular weight (Mn), weight average molecular weight (Mw), z-average molecular weight (Mz), molecular weight distribution (Mw/Mn), and

TABLE 1

| Ex./Comp. Ex. | Comp. Ex. 1a | Comp. Ex. 2a | Ex. 1a | Ex. 2a | Comp. Ex. 3a | Comp. Ex. 4a | Comp. Ex. 5a | Comp. Ex. 6a |
|---|---|---|---|---|---|---|---|---|
| Mesh size of polymer filter (μm) | 30 | 20 | 10 | 5 | 30 | 20 | 10 | 5 |
| Thickness of measurement sample (D1) (μm) | 2.3 | 2.3 | 2.3 | 2.3 | 2.3 | 2.3 | 2.3 | 2.3 |
| Number of insulation breakdown points (points/cm²) | 1.20 | 1.00 | 0.70 | 0.50 | 1.90 | 1.70 | 1.40 | 0.90 |
| Number of insulation breakdown points multiplied by thickness [(points/cm²); μm] | 2.76 | 2.30 | 1.61 | 1.15 | 4.37 | 3.91 | 3.22 | 2.07 |
| Total volume of protrusions (μm³) | 910 | 1140 | 1270 | 970 | 1200 | 1450 | 1330 | 1190 |
| Voltage in short-time pressure test [V] | 1224 | 1264 | 1276 | 1361 | 1078 | 1112 | 1126 | 1211 |

Figure 2A:
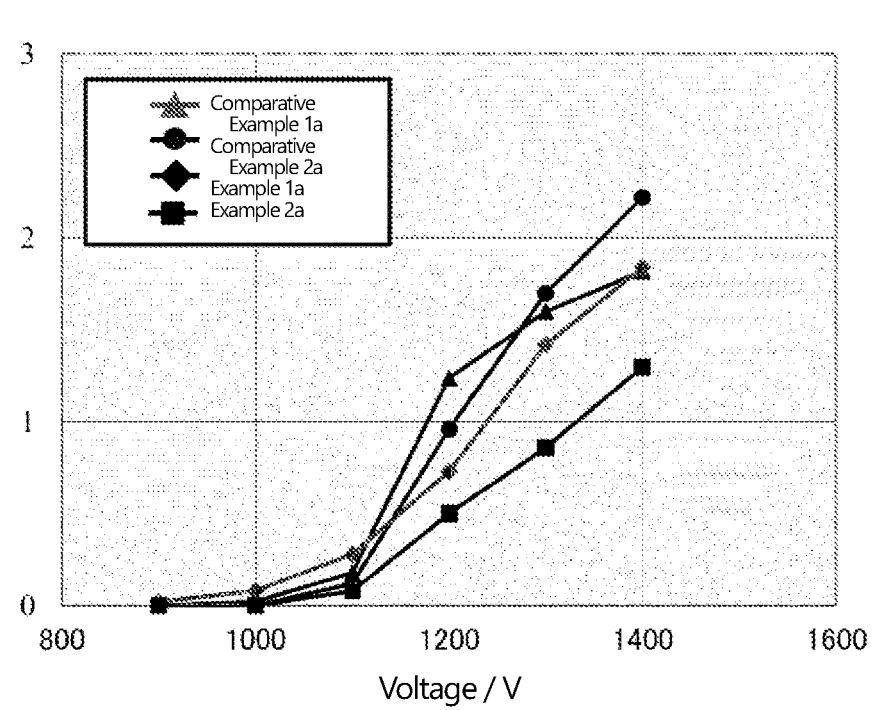
FIG. 2 (A) and FIG. 2 (B) show measurement results of the number of insulation breakdown points of Production Examples 1 to 4 and Production Examples 5 to 8.
Figure 2B:
Figure 2B:
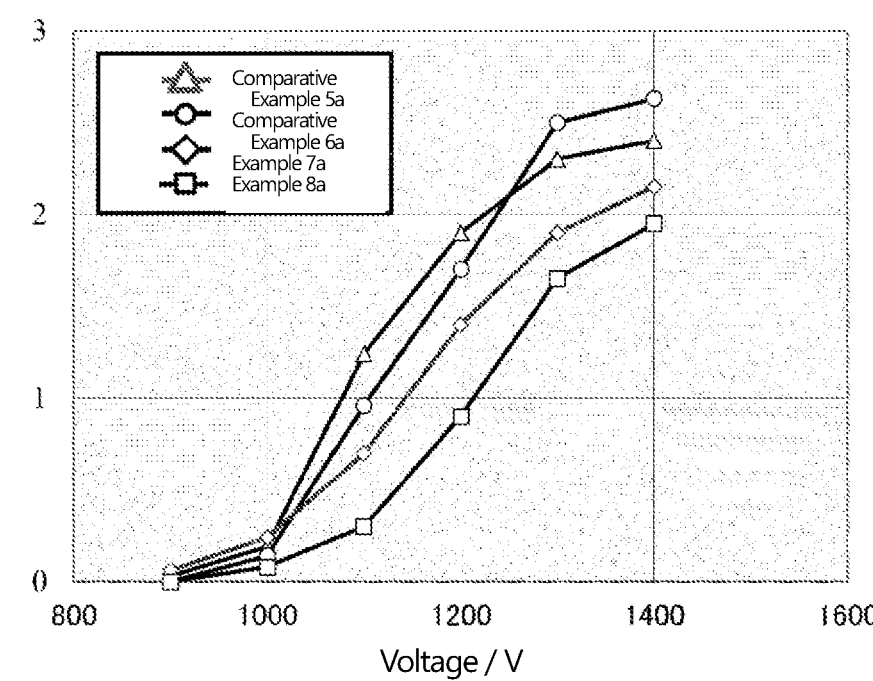

FIG. 2 (A) and FIG. 2 (B) show the measurement results of the number of insulation breakdown points.

Table 1 and FIG. 2 show that the metallized polypropylene films obtained in Examples 1a and 2a have fewer insulation breakdown points, indicating that they have excellent insulation breakdown resistance properties. The results also show that the metallized polypropylene films obtained in Examples 1a and 2a meet the standards for metallized polypropylene films in terms of the total volume of protrusions, discharge stability, and short-time pressure test.

Examples of Metallized Polypropylene Film Y and Comparative Examples

Metallized polypropylene film Y (metal layer-integrated polypropylene film) of the present invention is described in more detail below with reference to Examples. However, the present invention is not limited to the Examples as long as the gist thereof is not exceeded. Unless otherwise specified, parts and % indicate "parts by mass" and "mass %," respectively.

molecular weight distribution (Mz/Mn) of each resin were measured by GPC (gel permeation chromatography) under the following conditions.

Specifically, a high-temperature GPC system with a built-in differential refractometer (RI) (HLC-8121GPC-HT, produced by Tosoh Corporation) was used. As columns, three connected TSKgel GMHHR-H (20) HT columns, produced by Tosoh Corporation, were used. The measurement was performed at a column temperature of 140° C. while flowing trichlorobenzene as an eluent at a flow rate of 1.0 ml/min. A calibration curve for the molecular weight M was created using a polystyrene standard produced by Tosoh Corporation, and the measurement value was converted to the molecular weight of polypropylene using a Q-factor to obtain the number average molecular weight (Mn), weight average molecular weight (Mw), and z-average molecular weight (Mz). The values of Mw and Mn were used to obtain the molecular weight distribution (Mw/Mn). Further, the values of Mz and Mn were used to obtain the molecular weight distribution (Mz/Mn).

(1-2) Measurement of Melt Flow Rate (MFR)

The melt flow rate (MFR) of each resin in the form of the raw material resin pellets was measured by a Melt Indexer of Toyo Seiki Co., Ltd. according to the condition M of JIS K 7210. Specifically, first, a sample weighed to 4 g was inserted into a cylinder at a test temperature of 230° C., and preheated under a load of 2.16 kg for 3.5 minutes. Then, the weight of the sample extruded from the bottom hole for 30 seconds was measured, and MFR (g/10 min) was determined. The above measurement was repeated three times, and the average value was taken as the measured value of MFR. Table 1 shows the results.

(1-3) Measurement of Heptane Insoluble Content (HI)

Each resin was press-molded to 10 mm×35 mm×0.3 mm to prepare about 3 g of a measurement sample. Next, about 150 mL of heptane was added, and Soxhlet extraction was performed for 8 hours. The heptane insoluble content was calculated from the sample mass before and after extraction. Table 2 shows the results.

(1-4) Physical Property Values of Polypropylene Resins

TABLE 2

| | $Mw \times 10^3$ | $Mw \times 10^3$ | $Mw \times 10^3$ | Mw/ Mn | Mz/ Mn | MFR g/10 min | HI % |
|---|---|---|---|---|---|---|---|
| Resin A | 47 | 270 | 750 | 5.7 | 16 | 5.6 | 97.8 |
| Resin B | 46 | 380 | 1600 | 8.3 | 34.8 | 2.3 | 98.8 |

(2) Production of Biaxially Stretched Polypropylene Film

Resins A and B were dry-blended. The mixing ratio was a mass ratio of (resin A):(resin B)=75:25. Then, the dry-blended resin was melted at a resin temperature of 270° C., extruded through a T-die, and wound around a metal drum kept at a surface temperature of 98° C. for solidification. As a result, a cast sheet with a thickness of 115 μm was produced. At this time, the cast sheet was produced while pressing the melt-extruded resin composition against the metal drum with an air knife. The resulting unstretched cast sheet was kept at a temperature of 146° C., passed through rolls with a speed difference, stretched 5-fold in the machine direction at a stretching speed of 67300%/sec, and immediately cooled to room temperature. Subsequently, the stretched film was guided to a tenter, stretched 10-fold in the width direction at a temperature of 155° C. and a stretching speed of 335%/sec, and then relaxed and heat-fixed. Then, after the film surface (on the metal drum contact surface side) was subjected to corona discharge treatment in the air at a treatment speed of 25 W·min/m², the film was wound and subjected to aging treatment in an atmosphere of about 30° C. As a result, a biaxially stretched polypropylene film with a thickness of 2.3 μm was obtained.

(3) Measurement of Physical Properties of Biaxially Stretched Polypropylene Film (3-1) Measurement of Thickness of Biaxially Stretched Polypropylene Film The thickness (unit: μm) of the biaxially stretched polypropylene film produced in (2) above was measured. Specifically, the film thickness was measured according to JIS-C2330, except that the thickness was measured at 100±10 kPa using an MEI-11 paper thickness measuring instrument, produced by Citizen Seimitsu Co., Ltd. The thickness of the biaxially stretched polypropylene film was 2.3 μm.

(3-2) Measurement of Thermal Shrinkage at 120° C. of Biaxially Stretched Polypropylene Film The thermal shrinkage of the biaxially stretched polypropylene film produced in (2) under the treatment conditions of 120° C. for 15 minutes (thermal shrinkage at 120° C.) (unit: %) was measured. Specifically, samples were cut out from the roll. The size of samples for measuring thermal shrinkage at 120° C. in the MD direction was 130 mm in the MD direction and 20 mm in the TD direction, and the size of samples for measuring thermal shrinkage at 120° C. in the TD direction was 20 mm in the MD direction and 130 mm in the TD direction. Three samples were prepared for measuring thermal shrinkage at 120° C. in the MD direction, and three samples were prepared for measuring thermal shrinkage at 120° C. in the TD direction. Next, for the three samples for measuring thermal shrinkage at 120° ° C. in the MD direction, a marked line was drawn at a position 15 mm away from each end of a sample having a length of 130 mm in the MD direction. In this case, the distance between the marked lines was 100 mm. For the three samples for measuring thermal shrinkage at 120° C. in the TD direction, a marked line was drawn at a position 15 mm away from each end of a sample having a length of 130 mm in the TD direction. In this case, the distance between the marked lines was 100 mm. Each sample with the marked lines drawn was then hung with no load in such a manner that the direction cut out to a length of 130 mm was a vertical direction in a hot air circulation constant-temperature chamber at 120° C., and was maintained for 15 minutes. Thereafter, the samples were cooled at room temperature)(23° ° C., the distance between the marked lines was measured with a ruler, and the thermal shrinkage (%) of each sample was calculated by using the following formula.

Thermal shrinkage (%)=(distance between marked lines before heating–distance between marked lines after heating)/distance between marked lines before heating×100

The average value of the thermal shrinkage of the three samples for measuring thermal shrinkage at 120° C. in the MD direction was defined as the thermal shrinkage (%) at 120° C. in the MD direction. The average value of the thermal shrinkage of the three samples for measuring thermal shrinkage at 120° C. in the TD direction was defined as the thermal shrinkage (%) at 120° C. in the TD direction.

The measurement conditions other than those described here were according to "25. Dimensional Change" of JIS C 2151:2019.

The results show that the thermal shrinkage (%) at 120° C. of the biaxially stretched polypropylene film in the MD direction was 3.7% and that the thermal shrinkage (%) at 120° C. of the biaxially stretched polypropylene film in the TD direction was 0.4%.

(3-3) Measurement of Thermal Shrinkage at 140° ° C. of Biaxially Stretched Polypropylene Film The thermal shrinkage of the biaxially stretched polypropylene film produced in (2) under the treatment conditions of 140° ° C. for 15 minutes (thermal shrinkage at 140° C.) (unit: %) was measured. The thermal shrinkage (%) at 140° C. in the MD direction and the thermal shrinkage (%) at 140° C. in the TD direction were calculated in the same manner as in the method for measuring thermal shrinkage at 120° ° C., except that a hot-air circulation constant-temperature chamber at 140° ° C. was used in place of the hot-air circulation constant-temperature chamber at 120° C.

The results show that the thermal shrinkage at 140° C. of the biaxially stretched polypropylene film in the MD direction was 6.1% and that the thermal shrinkage at 140° C. of the biaxially stretched polypropylene film in the TD direction was 3.1%.

(3-4) Measurement of Tensile Modulus of Elasticity of Biaxially Stretched Polypropylene Film The tensile modulus of elasticity (unit: GPa) of the biaxially stretched polypropylene film produced in (2) was measured according to JIS K-7127 (1999). Specifically, samples were cut out from the roll. The size of a sample for measuring tensile modulus of elasticity in the MD direction was 200 mm in the MD direction and 15 mm in the TD direction, and the size of a sample for measuring tensile modulus of elasticity in the TD direction was 15 mm in the MD direction and 200 mm in the TD direction. A tensile test was then performed with a tensile compression tester (produced by Minebea Co., Ltd.) under conditions of a measurement temperature of 23° ° C., an inter-chuck distance of 100 mm, and a tensile speed of 200 mm/min. Subsequently, the tensile modulus of elasticity (GPa) in the MD direction and the tensile modulus of elasticity (GPa) in the TD direction were determined by automatic analysis using the data processing software provided in the tester.

The results show that the tensile modulus of elasticity of the biaxially stretched polypropylene film in the MD direction was 2.76 GPa and that the tensile modulus of elasticity of the biaxially stretched polypropylene film in the TD direction was 4.56 GPa.

(3-5) Measurement of Haze of Biaxially Stretched Polypropylene Film

The haze (unit: %) of the biaxially stretched polypropylene film produced in (2) was measured with a haze meter (NDH-5000, produced by Nippon Denshoku Industries Co., Ltd.) according to JIS K 7136:2000. A sample was cut out from the roll. The size of the sample was 50 mm in the MD direction and 100 mm in the TD direction. The results show that the haze of the biaxially stretched polypropylene film was 3.1%.

(4) Production of Cut Film Roll

From the roll of the biaxially stretched polypropylene film produced in (2) above, the film was unwound, and cut with a slitter in the width direction. When the cut polypropylene film was wound, a fiber-reinforced plastic core having an outer diameter of 176 mm was used, and the polypropylene film was wound while applying surface pressure thereto using a winding device provided with a contact pressure roll. The cutting conditions were a speed of 300 m/min, an unwinding tension of 40 N/m, a winding tension of 50 N/m, and a winding surface pressure of 400 N/m. The contact pressure roll used was made of rubber and had an outer diameter of 152 mm and a surface hardness of 40°. A biaxially stretched polypropylene roll (cut film roll) with a width of 620 mm and a length of 75,000 m was finished. Visual observation of the film during winding confirmed that there were no wrinkles. Observation from the end surface of the obtained cut film roll confirmed that there was no deviation of 2 mm or more.

(5) Production of Metal Layer-Integrated Polypropylene Films

Example 1b

Using a vapor deposition apparatus (product name: Evaporation Roll Coater EWE-060, produced by ULVAC, Inc.) under the conditions of a cooling roll temperature of −22° C., a voltage speed ratio per unit width of the cooling roll of 0.32 V·min/m², and an electrical discharge amount of 2.5 W·min/m², a special deposition pattern margin and an insulation margin were formed on the cut film roll produced in (4) above to impart film capacitor fail-safe ability to the roll, and aluminum deposition was applied so that the metal film had a surface resistivity of 20 Ω/sq, thereby obtaining a metal layer-integrated polypropylene film (metallized polypropylene film Y). FIG. 4 shows a schematic diagram of the metal layer-integrated polypropylene film. FIG. 5 shows a schematic diagram of the production apparatus.

Example 2b

A metal layer-integrated polypropylene film was obtained in the same manner as in Example 1b, except that the voltage speed ratio per unit width of the cooling roll was 0.21 V·min/m².

Example 3b

A metal layer-integrated polypropylene film was obtained in the same manner as in Example 1b, except that the voltage speed ratio per unit width of the cooling roll was 0.44 V·min/m².

Example 4b

A metal layer-integrated polypropylene film was obtained in the same manner as in Example 1b, except that the electrical discharge amount was 1.6 W·min/m².

Example 5b

A metal layer-integrated polypropylene film was obtained in the same manner as in Example 1b, except that the electrical discharge amount was 3.6 W·min/m².

Example 6b

A metal layer-integrated polypropylene film was obtained in the same manner as in Example 1b, except that the voltage speed ratio per unit width of the cooling roll was 0.21 V·min/m², and the electrical discharge amount was 3.6 W·min/m².

Comparative Example 1b

A metal layer-integrated polypropylene film was obtained in the same manner as in Example 1b, except that the voltage speed ratio per unit width of the cooling roll was 0.18 V·min/m².

Comparative Example 2b

A metal layer-integrated polypropylene film was obtained in the same manner as in Example 1b, except that the voltage speed ratio per unit width of the cooling roll was 0.47 V·min/m².

Comparative Example 3b

A metal layer-integrated polypropylene film was obtained in the same manner as in Example 1b, except that the electrical discharge amount was 1.3 W·min/m².

Comparative Example 4b

A metal layer-integrated polypropylene film was obtained in the same manner as in Example 1b, except that the electrical discharge amount was 3.9 W·min/m².

Comparative Example 5b

A metal layer-integrated polypropylene film was obtained in the same manner as in Example 1b, except that the voltage speed ratio per unit width of the cooling roll was 0.18 V·min/m², and the electrical discharge amount was 3.9 W·min/m².

Comparative Example 6b

A metal layer-integrated polypropylene film was obtained in the same manner as in Example 1b, except that the voltage speed ratio per unit width of the cooling roll was 0.47 V·min/m², and the electrical discharge amount was 3.9 W·min/m².

(6) Measurement of Physical Properties of Metal Layer-Integrated Polypropylene Film The cumulative insulation breakdown point density of each of the metal layer-integrated polypropylene films obtained in Examples 1b to 6b and Comparative Examples 1b to 6b was measured by the following procedure in the configuration shown in FIG. 3, after a cumulative DC voltage application test was performed by applying a step-wise-increased voltage in the range of 350 to 425 V/μm at 20° C. (cumulative insulation breakdown point density at 20° C. and 425 V/μm). After a DC voltage of 350 V/μm was applied at 20° C. for 1 minute, the number of insulation breakdown points in the window region of the insulating polypropylene film (100 mm×10 mm) was visually counted. After counting, a DC voltage of 375 V/μm was applied for 1 minute, and then the cumulative number of insulation breakdown points in the window region of the insulating polypropylene film was visually counted. Subsequently, the DC voltage was increased in increments of 25 V/μm, and this operation was repeated until the voltage reached 425 V/μm, thereby cumulatively applying DC voltages. The test was conducted using five sheets of metal layer-integrated polypropylene film, and the average of the cumulative insulation breakdown points at 20° C. and 425 V/μm was divided by the area of the window of the insulating poly-propylene film (100 mm×10 mm=1,000 mm²=0.001 m²) to determine the cumulative insulation breakdown point den-sity at 20° C. and 425 V/μm (unit: points/m²). Tables 3 and 4 show the results.

(7) Evaluation (7-1) Press Processing Yield Rate Evaluation

Each of the metal layer-integrated polypropylene films produced in the Examples and Comparative Examples was slit into small rolls with a width of 30 mm. Next, of the small rolls of the metal layer-integrated polypropylene film with a width of 30 mm, one small roll having an insulation margin (2 mm in length in width direction) on the left side when viewed from the unwinding side and one small roll having an insulation margin (2 mm in length in width direction) on the right side when viewed from the unwinding side were combined to wind the two films so that the electrode extraction portion of each of the small rolls protruded beyond the insulation margin of the other small roll of the metal layer-integrated polypropylene film. The winding was performed for 1350 turns at a winding speed of 4 m/sec, a winding tension of 180 g, and a contact roller contact pressure of 260 g using a 3KAW-N2 automatic winder (produced by Kaido Manufacturing Co., Ltd.).

The element-wound element was flattened by subjecting it to press processing under a load of 5.9 kgf/cm².

The side of the element that had been flattened by press processing was observed while the press load was applied, and the presence or absence of buckling of the metal layer-integrated polypropylene film was checked. Those in which buckling occurred were all rejected. The ratio of the number of flattened elements that passed the above criteria to all of the flattened elements was calculated as the press processing yield rate □, and evaluated according to the following criteria. Tables 3 and 4 show the results.

A: □=100%
B: 100%>□≥80%
C: 80%>□

(7-2) Evaluation of Performance of Capacitors

While the press load was applied to each element that had been flattened by press processing in (7-1), molten zinc metal was sprayed on the element end face under thermal spraying conditions of a feed speed of 20 mm/s, a thermal spraying voltage of 21 V, and a thermal spraying pressure of 0.4 MPa so that the thickness was 0.6 mm to 0.7 mm, to form an electrode extraction portion, followed by heat treatment in a vacuum constant-temperature chamber in a vacuum atmosphere at 120° C. for 15 hours for thermal curing. Thereby, flat film capacitors were obtained. Thereafter, leads were soldered to the element end face of the flat film capacitors and sealed with epoxy resin. The epoxy resin was cured by heating at 90° C. for 2.5 hours and then further heating at 120° ° C. for 2.5 hours. The capacitance of each of the obtained capacitors was 50 μF (±3 μF). The obtained capacitors were used in the following six tests.

(7-2-1) High-Temperature Short-Time Pressure Test of Capacitors (Capacitance Change)

The initial capacitance (C0) of each of the obtained capacitors before the test was measured with an LCR HiTESTER 3522-50 (produced by Hioki E.E. Corporation). Next, a DC voltage of 325 V/μm was applied to the capacitors in a constant-temperature chamber at 105° C. for 10 seconds. The capacitance of each of the capacitors after voltage application was measured in the same manner, and the change in capacitance before and after the test (ΔC) was calculated by using the following formula.

$$\Delta C = [(\text{capacitance after voltage application}) - C0]/C0 \times 100 (\%)$$

Subsequently, a DC voltage of 350 V/μm was applied in a constant-temperature chamber at 105° ° C. for 10 seconds, and the capacitance was measured in the same manner. The DC voltage was then increased in increments of 25 V/μm in a constant-temperature chamber at 105° C., and this opera-tion was repeated until the voltage reached 425 V/μm, thereby cumulatively applying DC voltages. The test was conducted using two samples, and the average value of the capacitance changes at 425 V/μm was evaluated according to the following criteria. Tables 3 and 4 show the results.

A: ΔC≥−2%
B: −2%>ΔC≥−5%
C: −5%>ΔC (7-2-2) 105° ° C. Lifetime Test of Capacitors (Capacitance Change)

The initial capacitance (C0) of each of the obtained capacitors before the test was measured with an LCR HiTESTER 3522-50 (produced by Hioki E.E. Corporation). Next, a DC voltage of 325 V/μm was continuously applied to each capacitor in a constant-temperature chamber at 105° C. for 1,500 hours. The capacitance of each capacitor after 1,500 hours (C1500H105C) was measured in the same manner, and the capacitance change before and after voltage application (ΔC105C) was calculated by using the following formula: ΔC105C=(C1500H105C−C0)/C0. The test was conducted using two samples, and the average value of the capacitance changes (ΔC105C) was evaluated according to the following criteria. Tables 3 and 4 show the results.

A: ΔC105C≥−15%
B: −15%>ΔC105C≥−25%
C: −25%>ΔC105C (7-2-3) 105° C. Lifetime Test of Capacitors (Insulation Resistance Value)

A DC voltage of 325 V/μm was continuously applied to each of the obtained capacitors in a constant-temperature chamber at 105° ° C. for 1,500 hours. An SME-8350 shielding box was connected to a DSM8104 super megohmmeter (produced by Hioki E.E. Corporation), each capacitor after 1,500 hours was placed in the shielding box, a DC voltage of 500 V was applied, and the insulation resistance value (IR105C) was read after 1 minute. The test was conducted using two samples, and the average value of the insulation resistance values (IR105C) was evaluated according to the following criteria. Tables 3 and 4 show the results.

The measurement conditions other than those described here were according to "4.2.4 Insulation Resistance" of JIS C 5101-16:2009.

A: IR105C≥500 MΩ
B: 500 MΩ>IR105C≥20 MΩ
C: 20 MΩ>IR105C (7-2-4) 115° C. Lifetime Test of Capacitors (Capacitance Change)

The initial capacitance (C0) of each of the obtained capacitors before the test was measured with an LCR HiTESTER 3522-50 (produced by Hioki E.E. Corporation). Next, a DC voltage of 325 V/μm was continuously applied to each capacitor in a constant-temperature chamber at 115° C. for 1,500 hours. The capacitance of each capacitor after 1,500 hours (C1500H115C) was measured in the same manner, and the capacitance change before and after voltage application (ΔC115C) was calculated by using the following formula: ΔC115C=(C1500H115C-C0)/C0. The test was conducted using two samples, and the average value of the capacitance changes (ΔC115C) was evaluated according to the following criteria. Tables 3 and 4 shows the results.

A: ΔC115C≥−20%
B: −20%>ΔC115C≥−30%
C: −30%>ΔC115C (7-2-5) 115° ° C. Lifetime Test of Capacitors (Insulation Resistance Value)

A DC voltage of 325 V/μm was continuously applied to each of the obtained capacitors in a constant-temperature chamber at 115° C. for 1,500 hours. An SME-8350 shielding box was connected to a DSM8104 super megohmmeter (produced by Hioki E.E. Corporation), each capacitor after 1,500 hours was placed in the shielding box, a DC voltage of 500 V was applied, and the insulation resistance value (IR115C) was read after 1 minute. The test was conducted using two samples, and the average value of the insulation resistance values (IR115C) was evaluated according to the following criteria. Tables 3 and 4 show the results.

The measurement conditions other than those described here were according to "4.2.4 Insulation Resistance" of JIS C 5101-16:2009.

A: IR115C≥150 MQ
B: 150 MΩ>IR115C≥20 MΩ
C: 20 MΩ>IR115C (7-2-6) High Voltage Application Test of Capacitors (Insulation Resistance Value)

A DC voltage of 1200 V was continuously applied to each of the obtained capacitors in a constant-temperature chamber at 105° C. for 10 minutes. An SME-8350 shielding box was connected to a DSM8104 super megohmmeter (produced by Hioki E.E. Corporation), each capacitor after 10 minutes was placed in the shielding box, a DC voltage of 500 V was applied, and the insulation resistance value (IR10) was read after 1 minute. The test was conducted using two samples, and the average value of the insulation resistance values (IR10) was evaluated according to the following criteria. Tables 3 and 4 show the results.

The measurement conditions other than those described here were according to "4.2.4 Insulation Resistance" of JIS C 5101-16:2009.

A: IR10≥5000 MΩ
B: 5000 MΩ>IR10≥20 MΩ
C: 20 MΩ>IR10

TABLE 3

| | Ex. 1b | Ex. 2b | Ex. 3b | Ex. 4b | Ex. 5b | Ex. 6b |
|---|---|---|---|---|---|---|
| Cumulative insulation breakdown point density at room temperature and 425 V/μm (points/m²) | 0 | 300 | 400 | 400 | 400 | 900 |
| Press processing yield rate | A | A | A | A | A | A |
| High-temperature short-time pressure test of capacitor (capacitance change) | A | A | A | A | A | B |
| 105° C. lifetime test of capacitor (insulation resistance value) | A | A | A | A | A | B |
| 115° C. lifetime test of capacitor (insulation resistance value) | A | B | B | B | B | B |
| High voltage application test of capacitor (insulation resistance value) | A | B | B | B | B | B |

TABLE 4

| | Comp. Ex.1b | Comp. Ex. 2b | Comp. Ex. 3b | Comp. Ex. 4b | Comp. Ex. 5b | Comp. Ex. 6b |
|---|---|---|---|---|---|---|
| Cumulative insulation breakdown point density at room temperature and 425 V/μm (points/m²) | 1200 | 1300 | 1300 | 1400 | 2800 | 3000 |
| Press processing yield rate | A | B | B | B | B | C |
| High-temperature short-time pressure test of capacitor (capacitance change) | C | C | C | C | C | C |
| 105° C. lifetime test of capacitor (insulation resistance value) | C | C | C | C | C | C |

TABLE 4-continued

|  | Comp. Ex.1b | Comp. Ex. 2b | Comp. Ex. 3b | Comp. Ex. 4b | Comp. Ex. 5b | Comp. Ex. 6b |
|---|---|---|---|---|---|---|
| 115°C lifetime test of capacitor (insulation resistance value) | C | C | C | C | C | C |
| High voltage application test of capacitor (insulation resistance value) | C | C | C | C | C | C |

DESCRIPTION OF THE REFERENCE
NUMERALS

A: Stack
1: Metallized polypropylene film
1a: Biaxially stretched polypropylene film
1b: First metal film
2: Conductive substrate
3: Insulating film
3a: Aperture portion
3b: Frame portion
4: Electrode

The invention claimed is:

1. A metallized polypropylene film comprising a polypropylene film and a metal layer stacked on one or both surfaces of the polypropylene film, the metallized polypropylene film having a cumulative insulation breakdown point density of 1000 points/m$^2$ or less after a cumulative DC voltage application test is performed by applying a stepwise-increased voltage in the range of 350 to 425 V/μm at 20° C., wherein the polypropylene film is treated at a voltage speed ratio per unit width of a cooling roll of 0.20 V min/m$^2$ or more and 0.45 V min/m$^2$ or less and at an electrical discharge amount of 1.5 W min/m$^2$ or more and 3.7 W min/m$^2$ or less.

2. The metallized polypropylene film according to claim 1, wherein the polypropylene film has a thickness of 1.0 to 3.0 μm.

3. The metallized polypropylene film according to claim 1, wherein when treated at 120° C. for 15 minutes, the polypropylene film has a thermal shrinkage of 0 to 8% in a first direction and a thermal shrinkage of −2 to 2% in a second direction that is orthogonal to the first direction.

4. The metallized polypropylene film according to claim 1, wherein when treated at 140° C. for 15 minutes, the polypropylene film has a thermal shrinkage of 0 to 10% in a first direction and has a thermal shrinkage of −1 to 5% in a second direction that is orthogonal to the first direction.

5. The metallized polypropylene film according to claim 1, wherein the polypropylene film has a tensile modulus of elasticity of 1.5 GPa or more in a first direction and a tensile modulus of elasticity of 3 GPa or more in a second direction that is orthogonal to the first direction.

6. The metallized polypropylene film according to claim 1, wherein the polypropylene film is a biaxially stretched film.

7. The metallized polypropylene film according to claim 1, wherein the polypropylene film is a single-layer film.

* * * * *